(12) United States Patent
Abarbanel et al.

(10) Patent No.: US 6,381,083 B1
(45) Date of Patent: Apr. 30, 2002

(54) MULTILEVEL SIGNAL EQUALIZATION UTILIZING NONLINEAR MAPS

(75) Inventors: Henry D. I. Abarbanel, Del Mar; James U. Lemke, San Diego; Lev S. Tsimring, San Diego; Lev N. Korzinov, San Diego; Paul H. Bryant, Encinitas; Mikhail M. Sushchik, San Diego; Nikolai F. Rulkov, San Diego, all of CA (US)

(73) Assignee: Applied Nonlinear Sciences, LLC, Del Mar, CA (US)

( * ) Notice: Subject to any disclaimer, the term of this patent is extended or adjusted under 35 U.S.C. 154(b) by 0 days.

(21) Appl. No.: 09/364,356

(22) Filed: Jul. 30, 1999

(51) Int. Cl.[7] .............................. G11B 5/09; G11B 5/035
(52) U.S. Cl. ............................ 360/46; 360/65; 706/22; 706/31
(58) Field of Search ....................... 360/46, 65; 706/22, 706/26, 31

(56) References Cited

U.S. PATENT DOCUMENTS 5,542,054 A * 7/1996 Batten, Jr. ................... 706/22
5,594,597 A * 1/1997 Padden ........................ 360/46
5,818,653 A * 10/1998 Park et al. .................... 360/32

* cited by examiner

Primary Examiner—Regina Y. Neal
(74) Attorney, Agent, or Firm—Daniel Robbins

(57) ABSTRACT

In a recording/playback system, increased information is achieved by 4 level biased magnetic recording where the maximum amplitude 4 level recording signal drives the medium's magnetization into a nonlinear region of its transfer function. The bias does not eliminate distortion at the maximum signal input level, however the system's signal to noise ratio is improved due to an increase in the amplitude of the playback signal resulting from the increased recording level. The nonlinear mapping capability of a neural network provides equalization of playback signals distorted due to the record/playback nonlinearity. The 4 level recorded signals provide a factor of 2 in information storage compared to binary recording, and quadrature amplitude modulation (QAM) combined with the 4 level recording technique provides an additional factor of 2, for a factor of 4 in the information content stored.

9 Claims, 23 Drawing Sheets

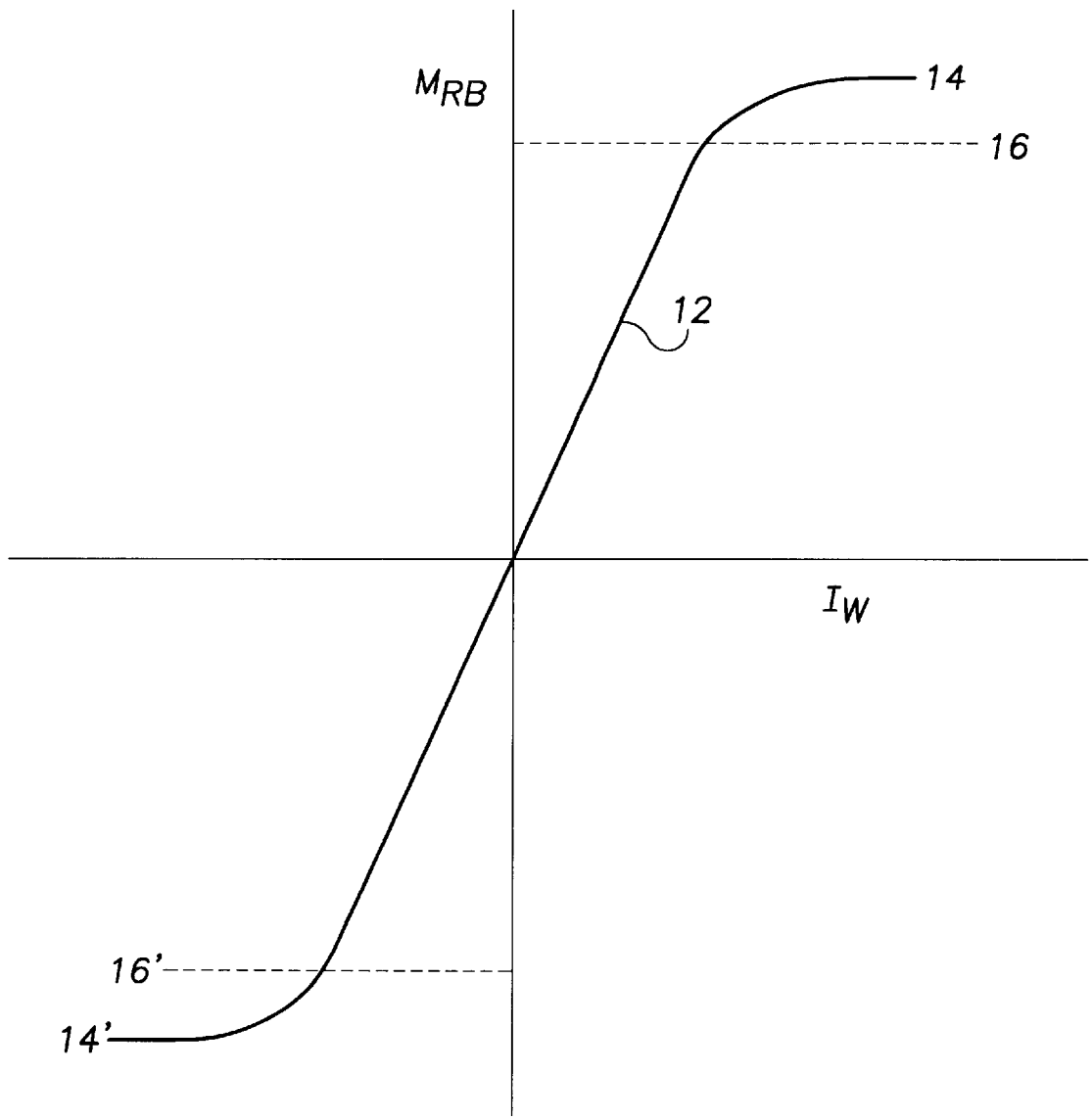

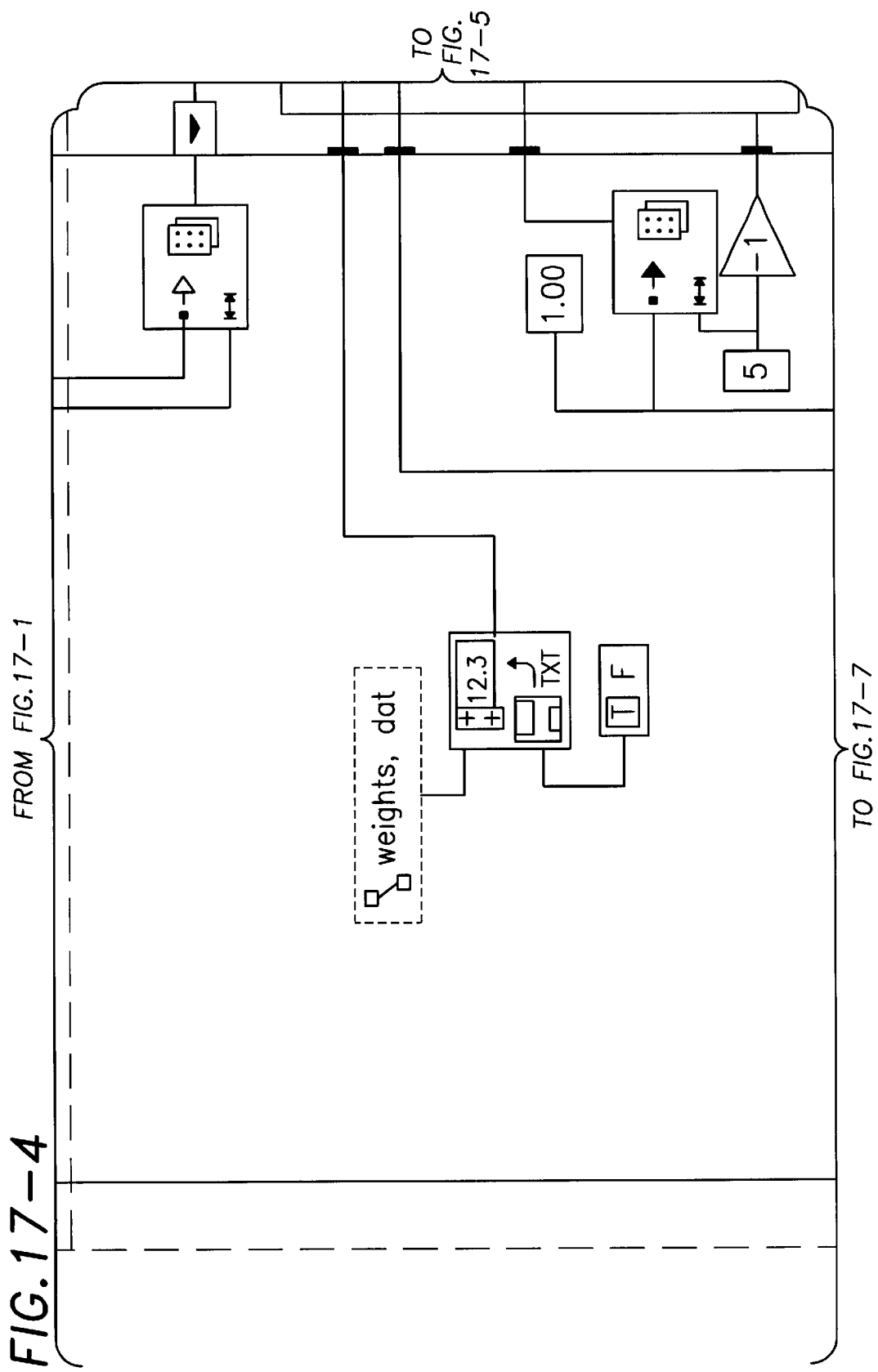

MULTILEVEL SIGNAL EQUALIZATION UTILIZING NONLINEAR MAPS

BACKGROUND OF THE INVENTION

1. Field of the Invention

This invention relates to signal recording and playback equalization, and in particular to recording and equalization of signals of a magnetic recorder.

2. Description Relative to the Prior Art

In order to attain higher transfer densities in the recording of digital magnetically recorded data, the trend has been towards ever increasing pulse packing on the medium. Typically the digital recording uses some form of binary encoding, such as NRZI, where binary 1's are represented as transitions from one state of magnetization of the medium to another state, and 0's are represented by no change in magnetization at specific clock times. The two states are usually the plus and minus saturation states of the medium, and the time of magnetization reversal during a transition is immaterial. Accordingly, the hysteresis of the medium does not directly affect the recording or recovery of the data in straight binary recording.

However, increasing the pulse packing of the medium leads to signal distortion on playback of the signal. The crowding together of the transitions causes peak shifts in the recovered signals, and adjacent transitions are no longer readily identifiable on playback., This is due to non-linearities arising from the mutual interference of sequentially recorded pulses on the magnetic medium, and becomes more severe as the recording density is increased.

It has been known in the prior art to use a neural network to represent nonlinear maps as part of a signal equalizer in a binary recording/playback system at high packing densities. U.S. Pat. No. 5,361,327 issued in the name of Takahashi discloses a magnetic disk drive system in which a computer simulated neural network is used to derive the parameter values of an equivalent "hard wired" neural network employed as a waveform equalizer. Similarly, Padden in U.S. Pat. No. 5,594,597 teaches the use of a neural network in a magnetic playback system to equalize a playback signal subject to playback non-linearities due to interference between crowded pulses. Padden applies his disclosure to a magnetic disk recording system. Such systems require varying the recording density as a function of the radius to maintain constant density recording, and also requires control of a phase locked loop to maintain constant recorded wavelength as a function of the radial location of the recorded zone. It will be appreciated that the above patents disclose magnetic recording systems in which only the two signals levels characteristic of saturation binary recording are recorded on the magnetic medium. The information content of such binary recording is limited by the use of two recording levels, and, as previously stated, by the non-linearities introduced by pulse crowding. In the binary recording systems of the prior art, the only way to increase information content is by higher density recording with a concurrent severe loss of signal-to-noise ratio and increase in the problem of playback equalization due to pulse crowding.

SUMMARY OF THE INVENTION

The present invention teaches the use of multilevel, high density magnetic recording to allow storage of quantized data with increased information content. The use of 4 level recording increases the information content by a factor of 2 compared to the binary recording of the prior art. The invention utilizes biased magnetic recording to eliminate the hysteresis present in the magnetic medium, thereby providing a single valued input/output transfer function necessary in a multilevel recording system. While the transfer function is single valued, it is linear only over the range from 0 magnetization to about −10 db below the saturation level. If recording is restricted solely to the linear range, then the signal to noise ratio (SNR) is correspondingly decreased. To utilize the maximum SNR available for recording, recording at levels into the non-linear region of the transfer function is permitted, and a nonlinear map having the ability to approximate a wide variety of multidimensional non-linear transformations is implemented to provide the waveform equalization necessary to recover the recorded data. In the preferred embodiment of this invention, realization of this map, representing the distortions of the communication channel, is realized using a neural network. The invention is disclosed using both 4 level amplitude modulation for an improvement by a factor of 2 in information content over straight binary recording, and by a combination of 4 level amplitude modulation and phase modulation in a quadrature amplitude modulation (QAM) configuration which provides a corresponding improvement by a factor of 4 over straight binary recording. More levels of recording both in amplitude and in phase are possible depending upon the signal-to-noise ratio attainable in the recorder system.

While the invention has been described in terms of magnetic recording, it will be appreciated that the teachings of the invention may be applied to recording and playback of quantized information from other media capable of supporting multiple level analog signal recording, such as or thermoplastic tape recording.

BRIEF DESCRIPTION OF THE DRAWINGS

The invention will be described with respect to the drawings of which:

FIGS. 17-1 to 17-9 are computer generated diagrams of the block diagram of the equalizer of the invention shown in FIG. 9.

DESCRIPTION OF THE PREFERRED EMBODIMENT

As is known in the art, the hysteresis of a magnetic recording medium can be eliminated by the addition of a high frequency bias signal to the signal record current. Additionally, the medium is also linearized over part of its range by the use of bias. The bias frequency is typically four to twenty times the band-edge frequency of the channel, and has an amplitude much larger than the signal current. A bias frequency of 2.5 Mhz is suitable for the recording of a bit rate signal of 300 Khz.

Figures 1, 9:
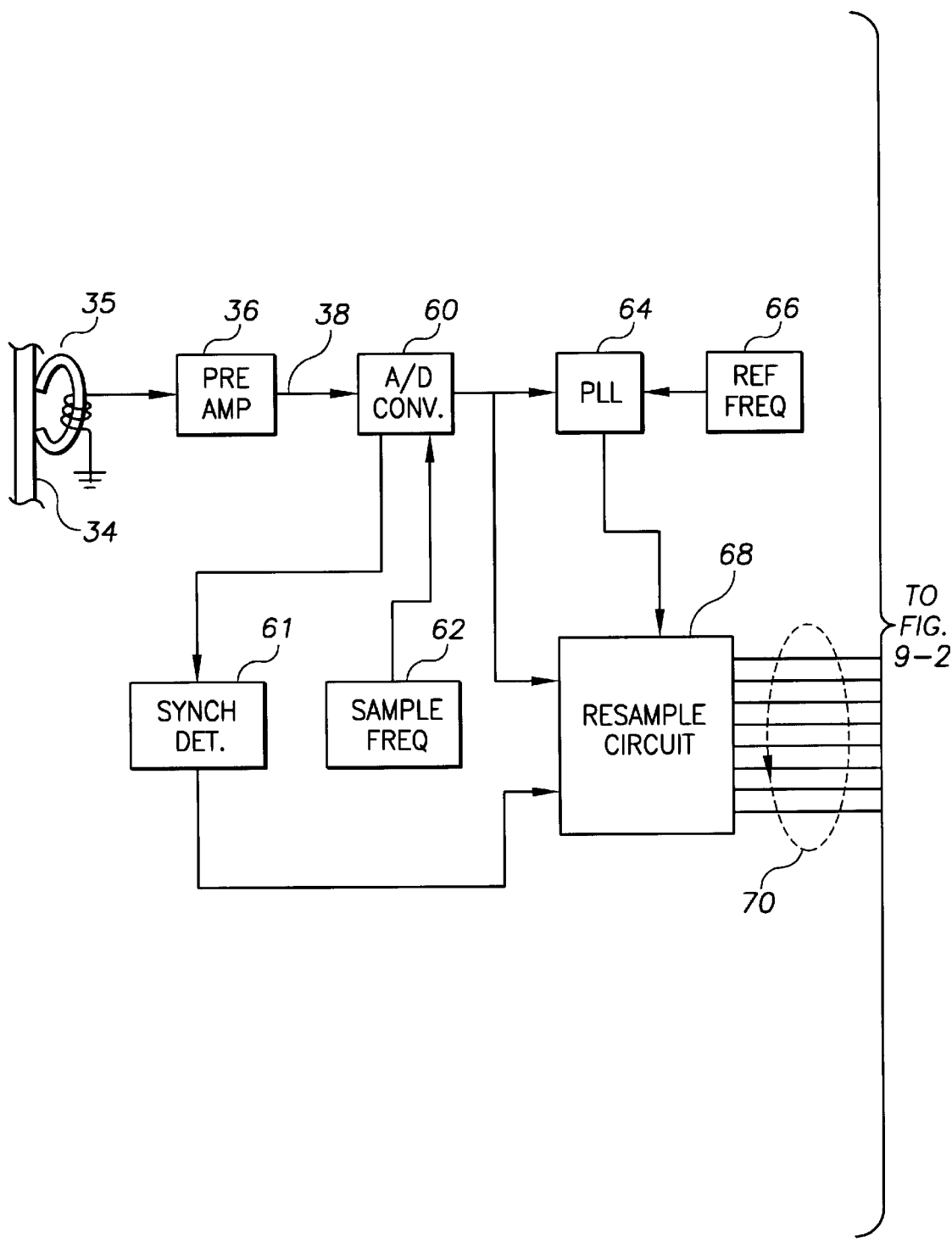
FIG. 1 is a graph of magnetization of a recording material as a function of write current with ac bias, known in the art.
FIG. 9 is a block diagram of a playback and equalization network in accordance with the invention.
Figures 2, 9:
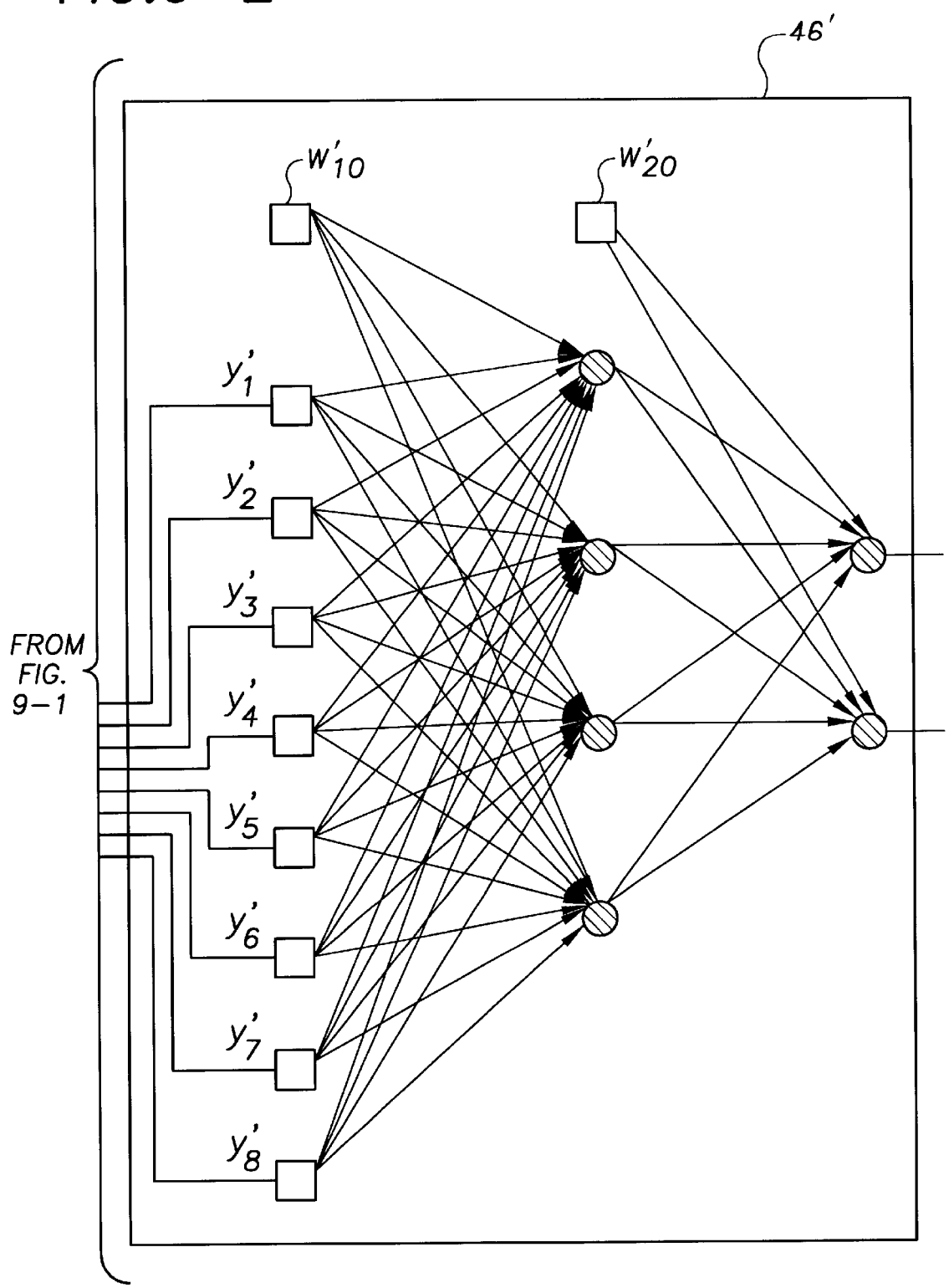

To set the channel for both linearity and maximum information capacity, the bias level and signal level are iteratively increased for maximum signal to noise ratio (SNR) at a 1%–3% distortion level. Under these conditions the channel is optimally set for linear recording, but the channel can be driven to 10 db more output at the price of increased distortion. As seen in FIG. 1, the output, which is proportional to the magnetization $M_{RB}$ (12), is a linear function of the biased write current $I_W$ up to level 16 in the positive direction or 16' in the negative direction, after which points an additional 10 db in dynamic range of the output is available at increased distortion until the saturation levels 14, 14' are reached.

Figure 2:
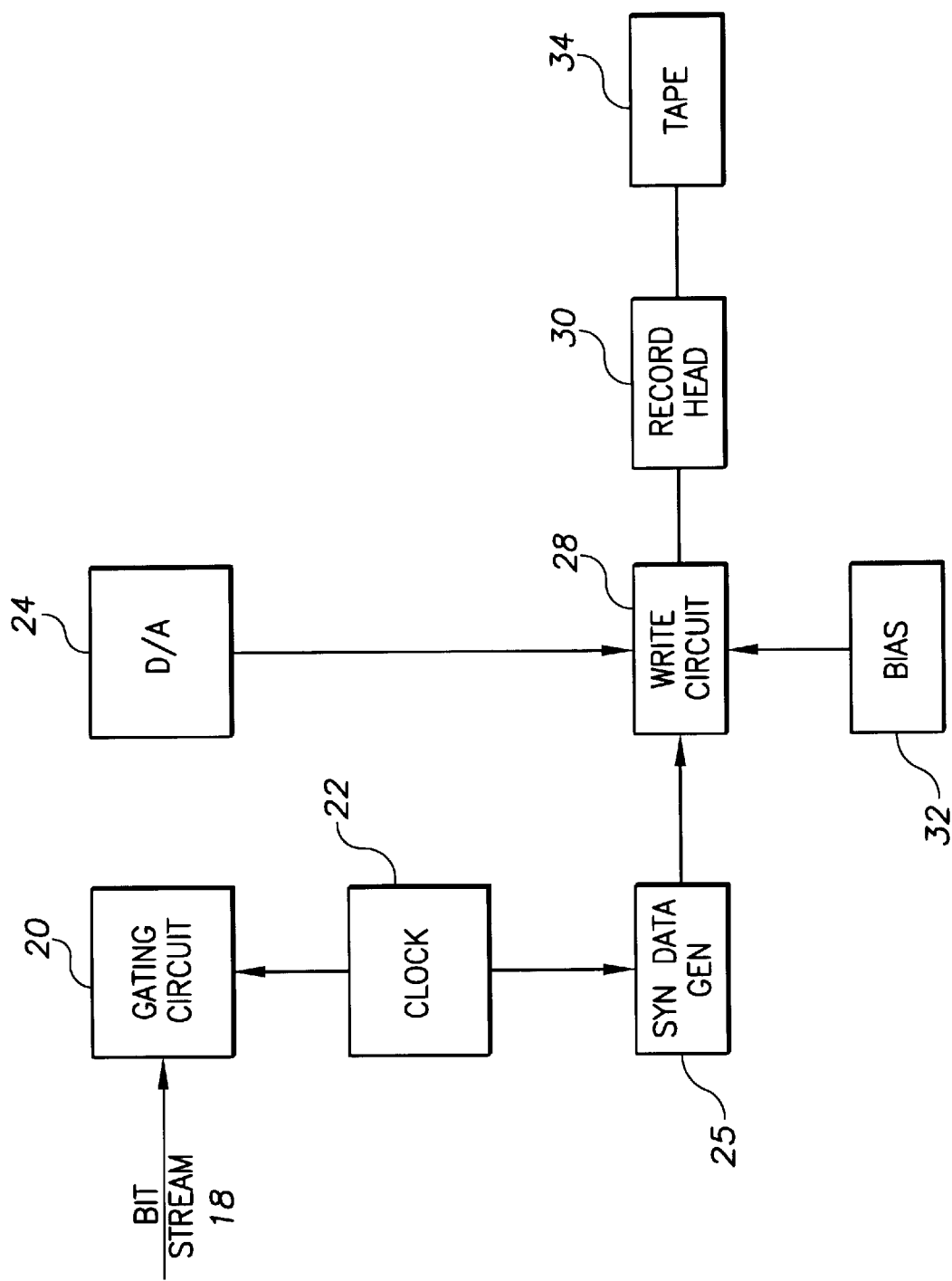
FIG. 2 is a block diagram of the recording circuitry of the invention.
Figure 3:
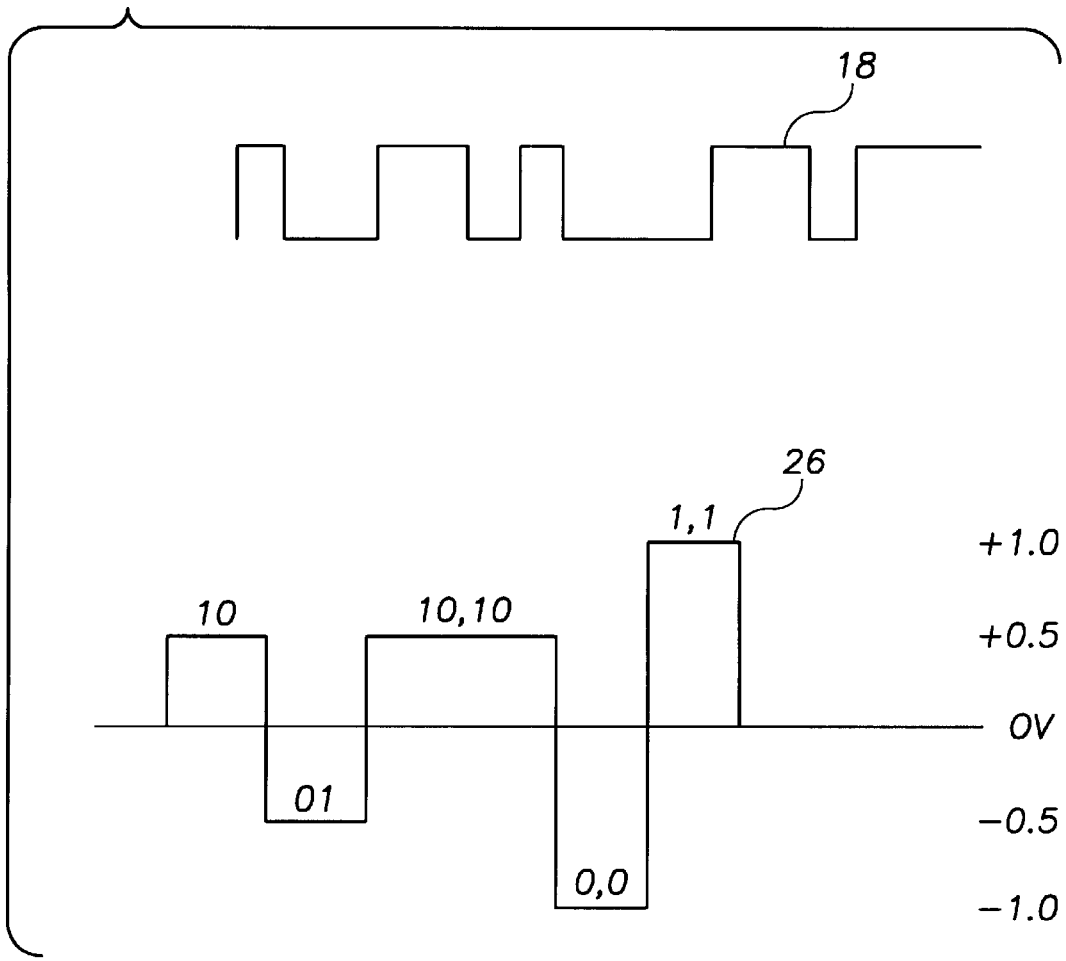
FIG. 3 is a drawing of a binary coded sequence and its representation as 4 level signals recordable by the invention.

The invention is broadly disclosed as the recording of quantized signal levels, and a first embodiment of the invention is implemented as the recording of a digital input stream. Consider the recording of a binary data sequence 18, for example, 10011010001101, as a 4 level code, (FIG. 3). The sequence 18 is applied (FIG. 2) to a gating circuit 20 under control of clock 22, and the sequence 18 is partitioned into 2 bit groups, i.e., 10, 01, 10, 00, 11, 01, which then feed a D/A converter 24. As shown in FIG. 3 each two bit group, depending upon its value, is converted into 1 to 4 voltage amplitudes resulting in the 4 level quantized waveform 26. The waveform 26 has been biased to provide 4 equi-spaced levels as follows:

TABLE I

| Digital Value | Voltage |
| --- | --- |
| 00 | −1.5v |
| 01 | −0.5v |
| 10 | 0.5v |
| 11 | 1.5v |

Figure 4:
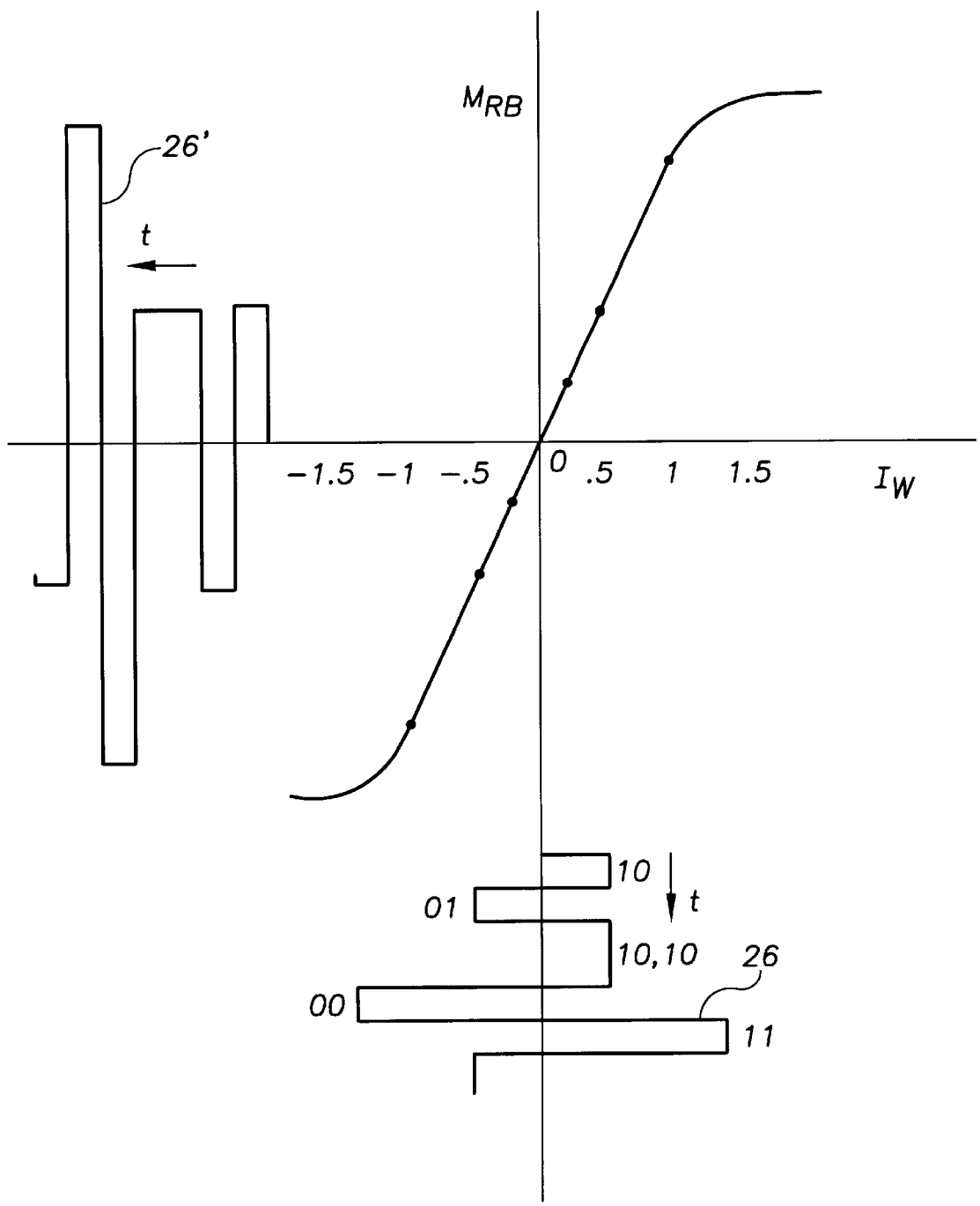
FIG. 4 is a drawing illustrating an example of recording magnetization of the medium in accordance with the invention.

The waveform 26 is applied to the write circuit 28 where the bias signal from the bias source 32 is linearly added to the write current $I_W$ driving the record head 30. Also recorded at the beginning of each data sequence are synchronization signals from a synch generator 25. Referring to FIG. 4 the 4 level bipolar input waveform 26 varies the write current $I_W$ through the record head 30 to provide corresponding magnetization waveform 26' on the magnetic tape 34. (In the drawings, different but related elements are identified by the same reference character, albeit that the different elements are distinguished by primes.) On playback of the tape 34, (FIG. 9), the output of a playback head 35 and associated amplifier 36 is approximated by the waveform 38 of FIG. 5.

Figure 8:
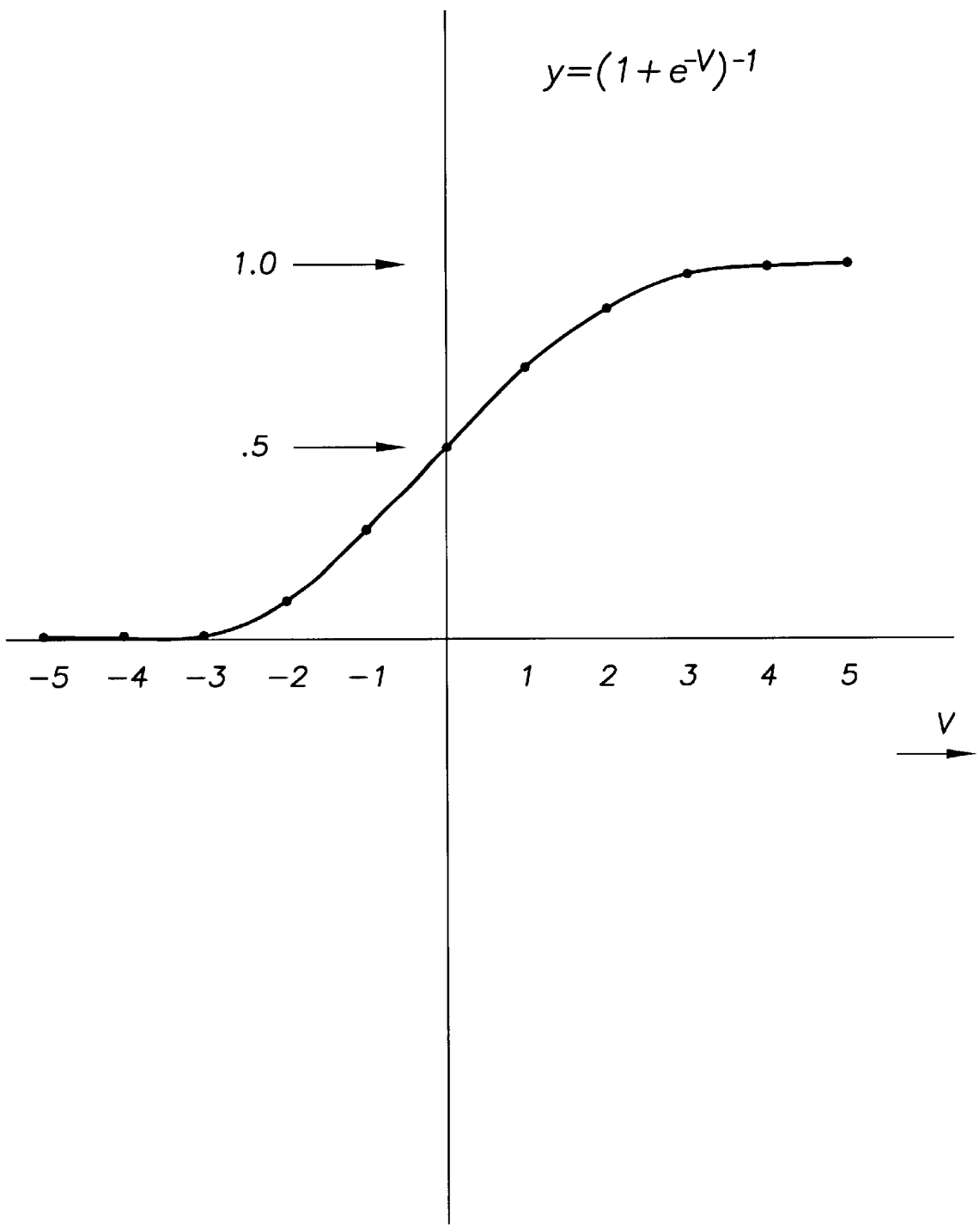
FIG. 8 is a graph of a neuron output, known in the art.

The playback signal 38 is equalized by a non linear map realized here as a neural network capable of a wide range of multidimensional nonlinear transformations to generate the output values equivalent to input data. Such neural networks, known in the art, consist of artificial "neurons" interconnected in layers. A typical non-linear model of a neuron, shown in FIG. 6a, accepts inputs $y_p$, each of which is weighted by a synaptic weight $w_{kp}$, and the weighted inputs are then fed to a summing junction Σ (40). A fixed input $y_0$ with a weighing function $w_{kO}$ is also applied to the summing junction 40 as an offset or bias amount. The output of the summing junction 40 is applied to an activation function 42, which limits the output amplitude of the neuron. This activation function is approximated in the present invention by a sigmoid function having the form plotted in FIG. 8, and is represented by the expression $y=(1+e^{-V})^{-1}$, where y is the output level of the activation function, and V is the output of the summing junction 40 feeding the activation function 42.

Figure 6A:
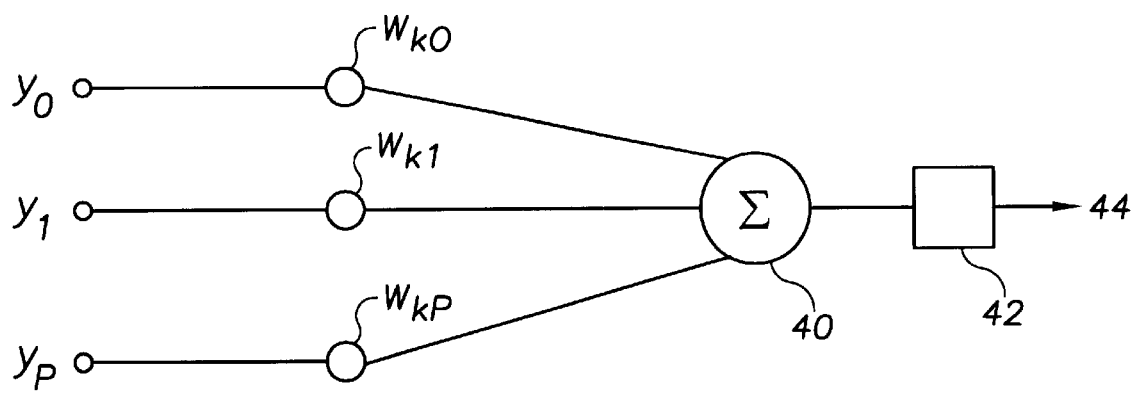
FIG. 6a is a drawing of a neuron circuit, known in the art.
Figure 6B:
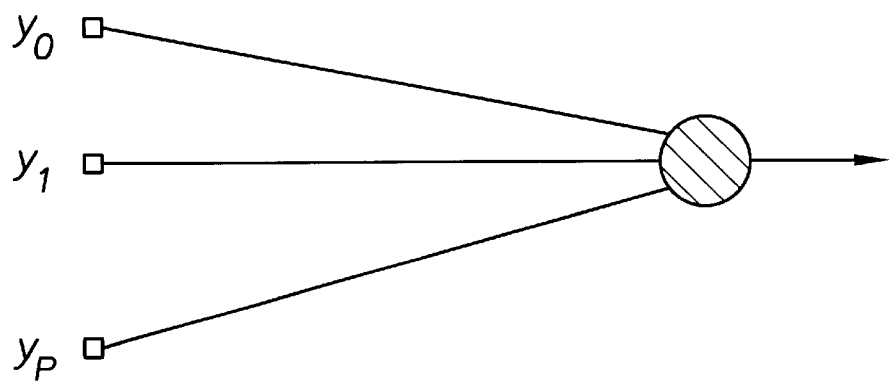
FIG. 6b is a drawing of a reduced form of the neuron circuit of FIG. 6a, FIG. 7 is a drawing of a neural network, known in the art.

A reduced form of the schematic of the neuron shown in FIG. 6a is illustrated in FIG. 6b, and is useful when the focus of attention is directed to signal flow from neuron to neuron. In this representation, the neuron is represented as a single node, the entire neuron, including the summing junction and the activation function, being shown as a shaded circle with input lines directed to the circle and an output line directed away from the circle. The weighing values for the input signals, i.e. the w's of FIG. 6a, are assumed to be incorporated into this schematic representation of the neuron of FIG. 6b.

Figure 7:
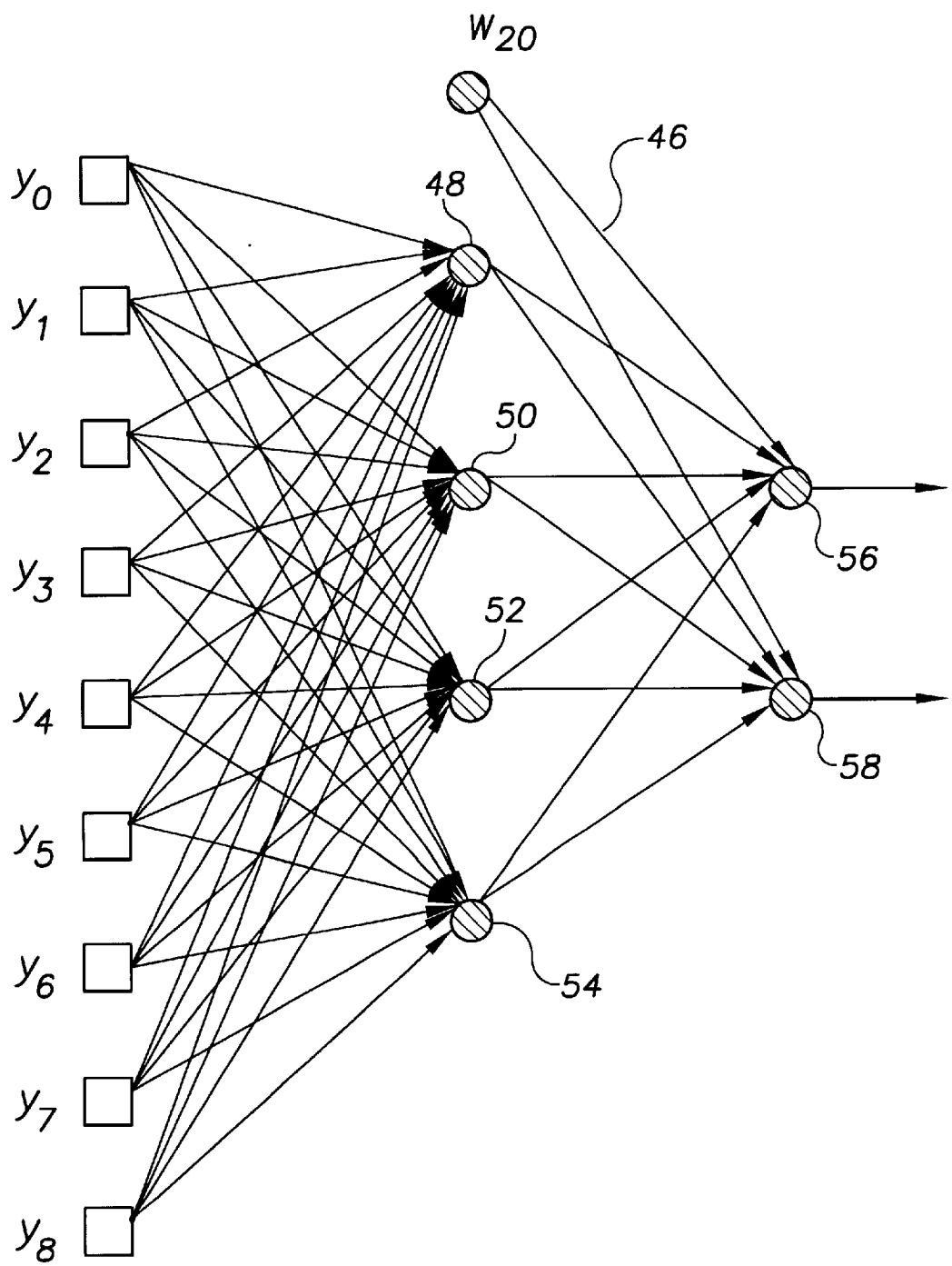

Referring to FIG. 7, a neural network 46 using the representation of FIG. 6b consists of a "hidden" layer of neurons 48, 50, 52, 54 and an output layer of neurons 56, 58. The network 46 is configured to accept eight input signals, $Y_1$–$Y_8$ as will be explained below, and a threshold signal $y_0$, for a total of 9 inputs. Each input, $y_0$–$y_8$ feeds each one of the "hidden" layer neurons 48, 50, 52, 54, and at each neuron the inputs are "synaptically weighted" i.e. assigned weighing values, as described above. The outputs of the hidden layer 48, 50, 52, 54 are input to the neurons 56, 58 which are the output layer neurons, and are synaptically assigned weights in a similar manner. In addition to the outputs from each of the 4 hidden layer neurons, the neurons 56, 58 have fixed inputs $w_{20}$ which set their threshold levels, for a total of 10 synaptically adjusted inputs. Therefore the total number of synaptic weights for the neural network (reference no. 46) is 36+10=46 weights. The outputs of the neurons 56, 58 are the outputs of the neural network 46.

The neural network must first be trained by a learning process which establishes the synaptic weights and biases for each neuron. Typical random input vectors having known binary values are converted to equivalent 4 level signals and recorded. The resultant analog playback signals are digitized and applied to the neural network as inputs. The neural network generates equalized output signals that are compared to the applied known binary input sequences. The error between the inputs and the neural network response is driven to a minimum by an "error back-propagation" algorithm through the assignment of appropriate synaptic weights to each neuron. The use of this algorithm to establish synaptic weights for a neural network is known in the prior art, and is described in the book "Neural Networks" by Simon Haykin, MacMillan College Publishing Company, New York, 1994, pp.47–49.

Figure 5:
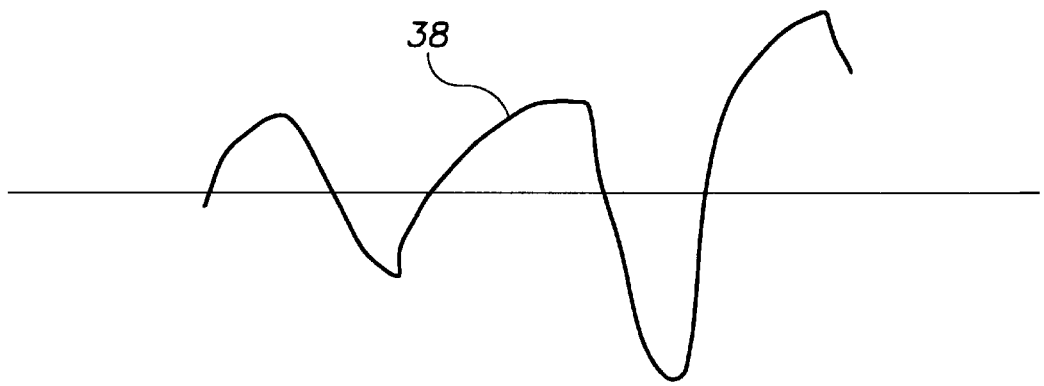
FIG. 5 is a drawing illustrating the playback signal for the recorded example of FIG. 4.

The playback signal 38 of FIG. 5, both during the training process and for the data recovery process, is transformed before application to the neural network in the following way. Referring to FIG. 9, a playback head 35 feeds signal from the recorded tape 34 to a preamp 36 whose output 38 is digitized by an analog to digital converter 60 at a rate controlled by a sampling frequency generator 62. This operation is the inverse of the digital to analog conversion performed prior to recording. The analog output 38 is digitized and partitioned to provide 2 bit groups in accordance with Table I, supra.

The recorded data begins with a synchronizing pattern followed by, i.e., thirty equilevel transitions. A synchronization detector 61 starts data recovery, i.e., thirty transitions after detecting synchronization. The digitized signal is also applied to a phase lock loop 64 operated from a reference frequency generator 66. For binary input data having 600 kilo-transitions per second, (600 Khz bit rate), the sampling frequency generator 62, and the reference frequency generator 66 were both adjusted for pulse output rates of 1.2 Mhz, i.e. repetition rates of 0.8333 microseconds.

A resampling circuit 68 creates sets of vectors from the digitized input signals which serve as inputs to the neural network equalizer 46'. These vectors consist of components which constitute a sequence of samples of the input signal having proper phase and the necessary time delay between samples. For an input sequence $A(m)=z(m\tau)$, the resampling circuit 68 generates and stores a sequence of vector components: $x(m\tau-\phi)$, $x(m\tau+\Delta-\phi)$, $x(m\tau+2\Delta-\phi)$, $x(m\tau+3\Delta-\phi)$, $x(m\tau+4\Delta-\phi)$, $x(m\tau+5\Delta-\phi)$, $x(m\tau+6\Delta-\phi)$, $x(m\tau+7\Delta-\phi)$: where $\phi$ is the phase established by the PLL 64 and $\tau$ and $\Delta$ are the sampling time interval and time delay, i.e. each 0.8 microseconds in the example given above. The required number of vector components equals the number of transitions in each block of the input sequence, and the value of each vector component is stored in the resampling circuit 68 to be simultaneously applied as parallel inputs to the neural network. The above enumerated 8 vector components are collectively designated by the reference character 70.

The vector components 70 are applied to the corresponding inputs $y'_1$ to $Y'_8$ of the neural network 46' having the same neuron configuration as FIG. 7. The neuron threshold sources are input via terminals $w'_{10}$ and $w'_{20}$. By use of the "error back-propagation" algorithm known in the art, the 46 synaptic weights (including the weights assigned to the thresholds) are calculated in the training phase, and these weights are then stored to configure the neurons for equalization of the sequences of playback data. The training data contains 1950 samples, each sample consisting of an 8 dimensional input vector and a 2 dimensional output vector. The output vector is compared to the appropiate 2 bits of the original recorded binary signal value, and the difference is the error signal which drives the "error back-propagation" algorithm.

The neural network output consists of two floating point values corresponding to two independent binary bits. The following table summarizes the neural network voltage outputs and the correspondence to the original binary bit values.

| Input Level | Neural Network Output | Bit Combination |
|---|---|---|
| 0 | (0.1, 0.1) | (0,0) |
| 1 | (0.1, 0.9) | (0,1) |
| 2 | (0.9, 0.1) | (1,0) |
| 3 | (0.9, 0.9) | (1,1) |

During the data recovery process, the output value of each component of the neural net is compared to a level of 0.5 in a standard "slicer" circuit. If it is less than 0.5 the output equals 0, and if it is greater the output equals 1.

Following the above teachings, data was recorded and played back attaining an error rate of $2 \times 10^{-5}$.

In a second embodiment of the invention, the four level amplitude modulation of the first embodiment is combined with phase modulation in a QAM configuration. This allows the compression and magnetic recording of 16 four bit groups within the bandwidth that would resolve 2 bits of straight binary recording. It is known in the art, that organizing the data into a square array constellation is an optimal configuration for QAM encoding of a channel. The following example demonstrates the organization of such a constellation.

Consider the recording and playback of the following binary sequence by means of QAM encoding: 11101101000001110100101011.

For convenience of notation the following abbreviated designation of sequential arrangement of two contiguous digits is employed:

00→−1
01→1
10→−3
11→3

Using this convention, and dividing the above binary sequence into four bit segments, the above binary sequence translates into the following double digit combinations:

(3,−3) (3,1) (−1,−1) (1,3) (1,−1) (−3,3)

Figure 10:
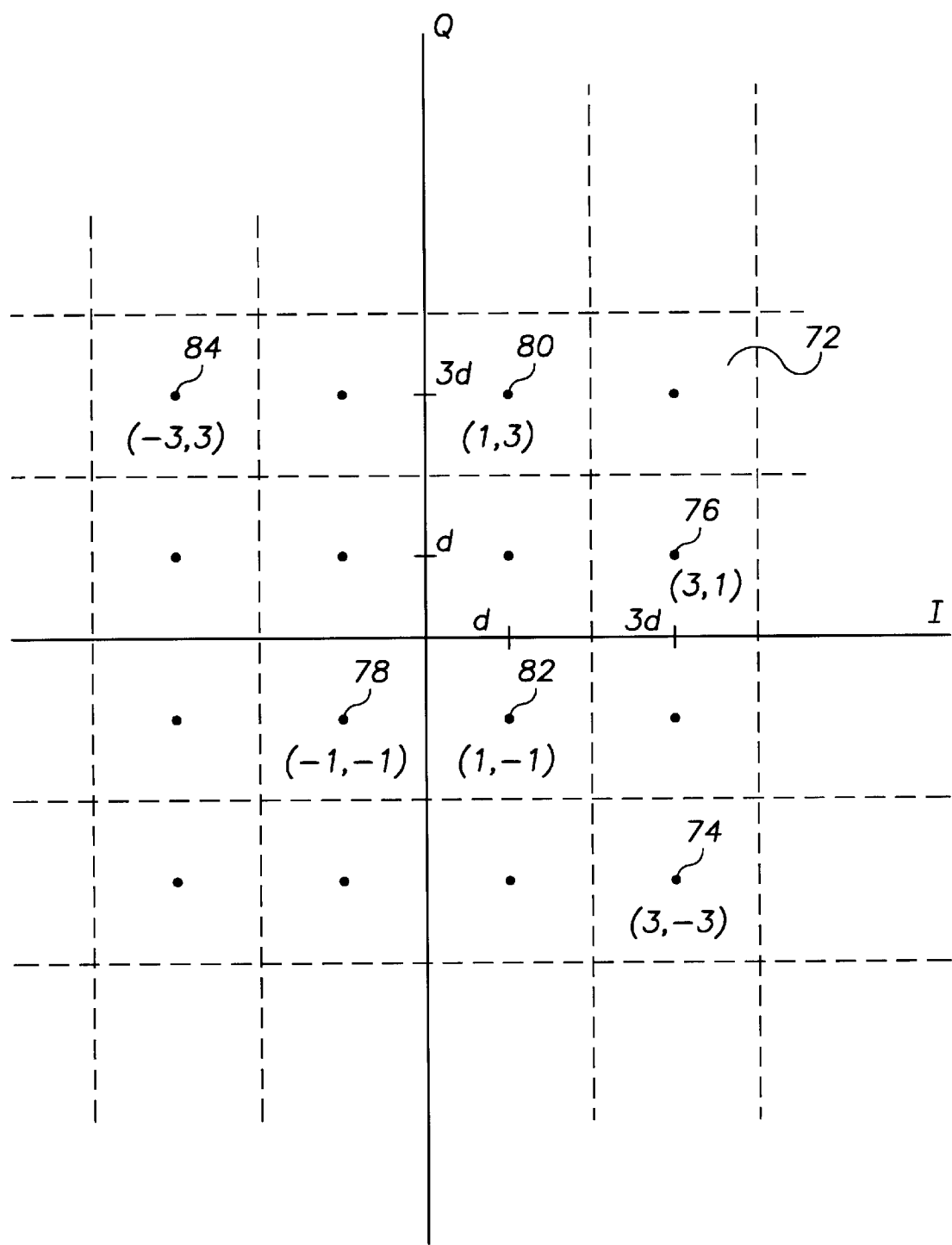
FIG. 10 is a drawing of an array of signal constellation in a QAM system, known in the art.

Notice that order is important both within and without the parentheses, that is, for example, (3,−3) is 1110, and these are the first four bits of the original binary sequence. Referring now to FIG. 10, an array comprised of 16 sub-squares, i.e. 72, is the locus of the coordinates of the data points representing the constellation to be recorded. With respect to the orthogonal coordinate axes labelled I and Q, the centers of the sub-squares are at distances along the axes of d and 3d units. Thus the above pairs of data enclosed in parentheses may be plotted as I, Q Cartesian coordinates, as shown in FIG. 10. These points 74,76,78,80,82,84 are to be recorded in the proper time sequence to preserve the timing of the original binary data. Each point, 74–84, e.g. 74, consists of two coordinates, an I (in phase) coordinate specified as 74$_I$, and a quadrature coordinate specified as 74$_Q$.

Figure 11:
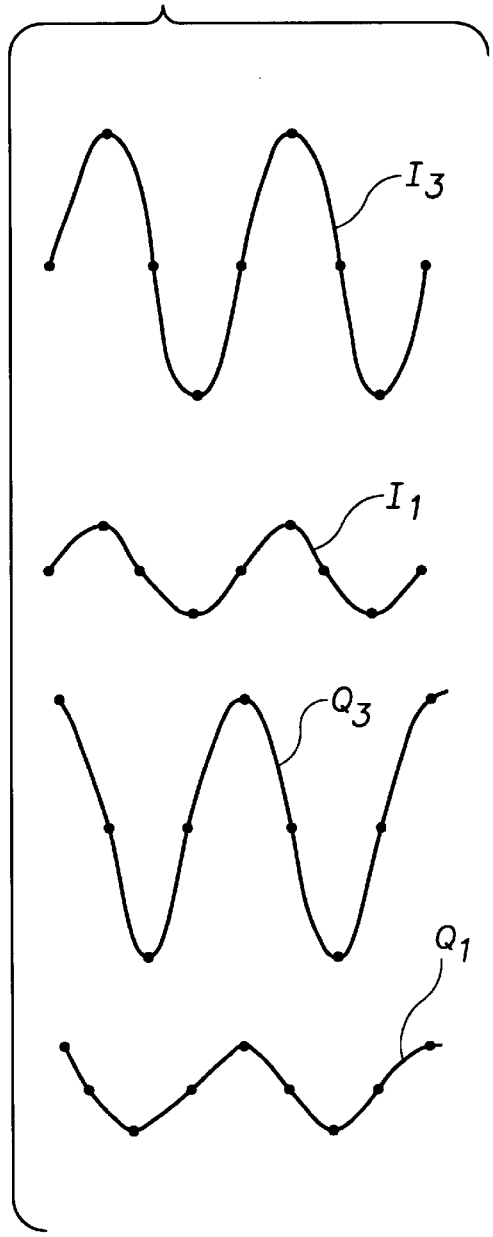
FIG. 11–13b are drawings useful in understanding a second embodiment of the invention.
Figure 12:
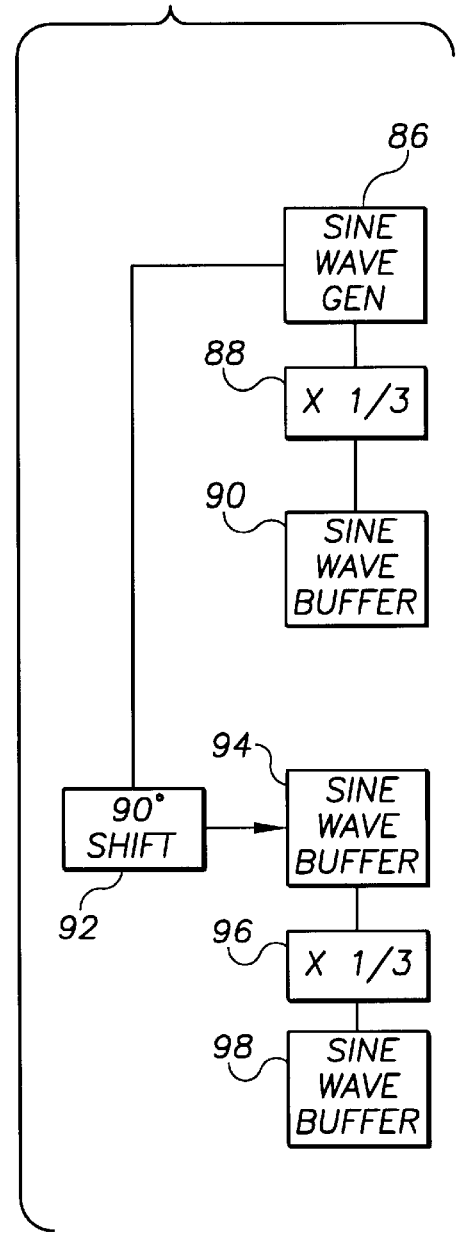

Recording is effected by means of four sinusoidal signals, represented in FIG. 11, as $I_3$, $I_1$, $Q_3$, $Q_1$ where the I and Q sine waves are of the same frequency, but are shifted in phase by 90 degrees with respect to each other. Also, the $I_3$ and $Q_3$ signals have three times the amplitude of the $I_1$ and $Q_1$ signals corresponding to the amplitudes of the signal levels to be recorded. Referring to FIG. 12, the signals of FIG. 11 are generated from a base frequency generator 86 whose output is $I_3$, which is also applied to a ⅓ attenuator circuit 88, and whose output drives a buffer 90, having as output the signal $I_1$. The output of sine wave generator 86 is also applied to a 90 degree phase shifter 92 feeding a buffer 94, whose output is $I_3$. The output of buffer 94 is also applied to a ⅓ attenuator circuit 96 which feeds a buffer whose output is the $Q_1$ sine wave. Hence, two sets of sine wave signals are generated; the first set consists of two in-phase signals of relative amplitudes 3:1, and the second set consisting of two in-phase signals of relative amplitudes 3:1, where the second set of signals are shifted in phase with respect to the first set by 90 degrees. It is to be noted that the sine waves of FIG. 13*b*, have a definite time relationship to the transitions of the waveform of FIG. 13*a*. Synchronization of these waveforms on the record side is maintained by use of conventional techniques.

Figure 13A:
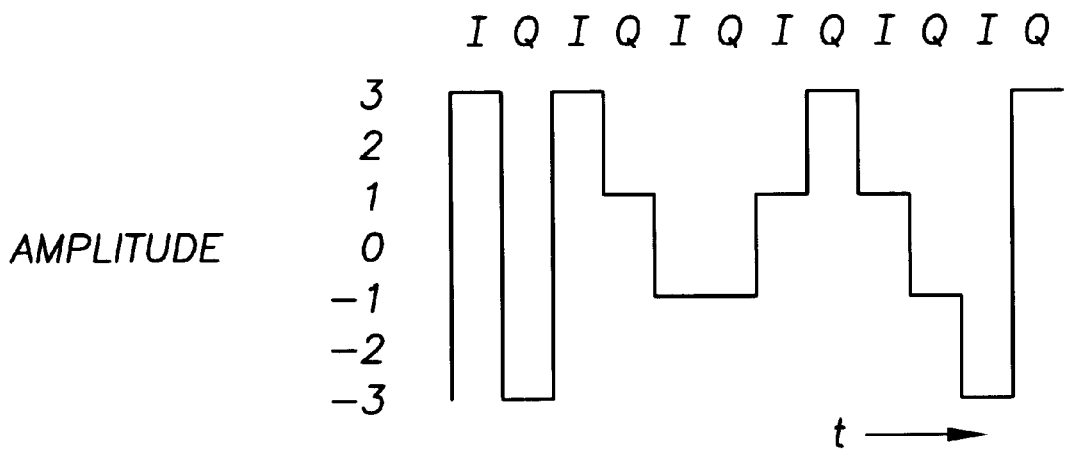
Figure 13B:
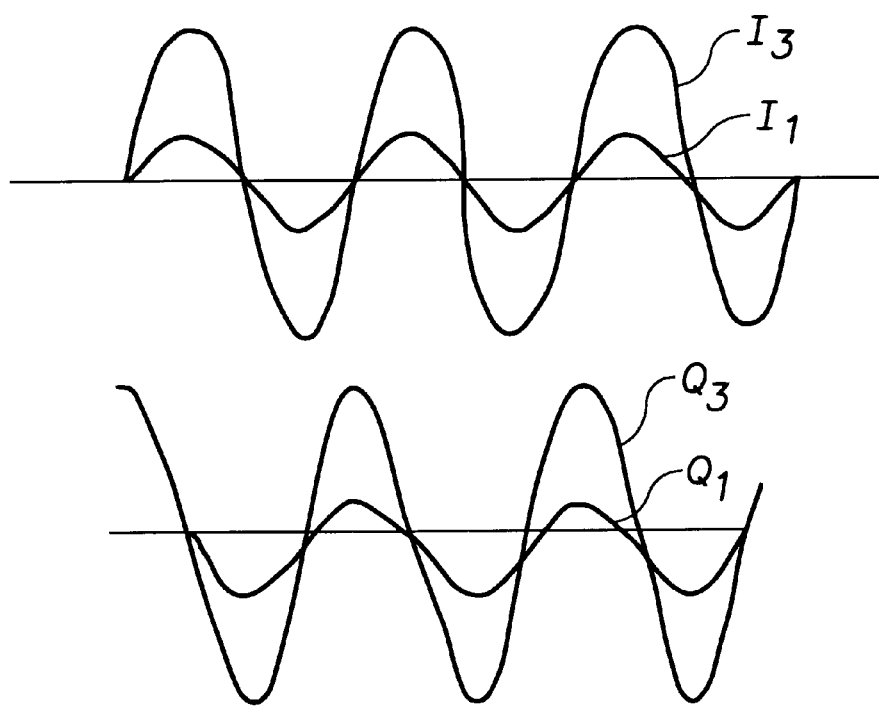

Referring to FIG. 13*a*, the I and Q signals of FIG. 10 are to be recorded with the relative amplitudes and the time sequence illustrated. Recording is effected by sequential selection of one of the signals $I_3$, $I_1$, $Q_3$, $Q_1$ (FIG. 13*b*) to drive the write circuit 28 (FIG. 2) in 1:1 correspondence with the amplitudes of the I,Q signals shown in FIG. 13a. A synchronizing sequence including a burst of the $I_3$ signal is also recorded which will allow recovery of $I_3$, $I_1$, $Q_3$, $Q_1$ on playback.

Figure 14:
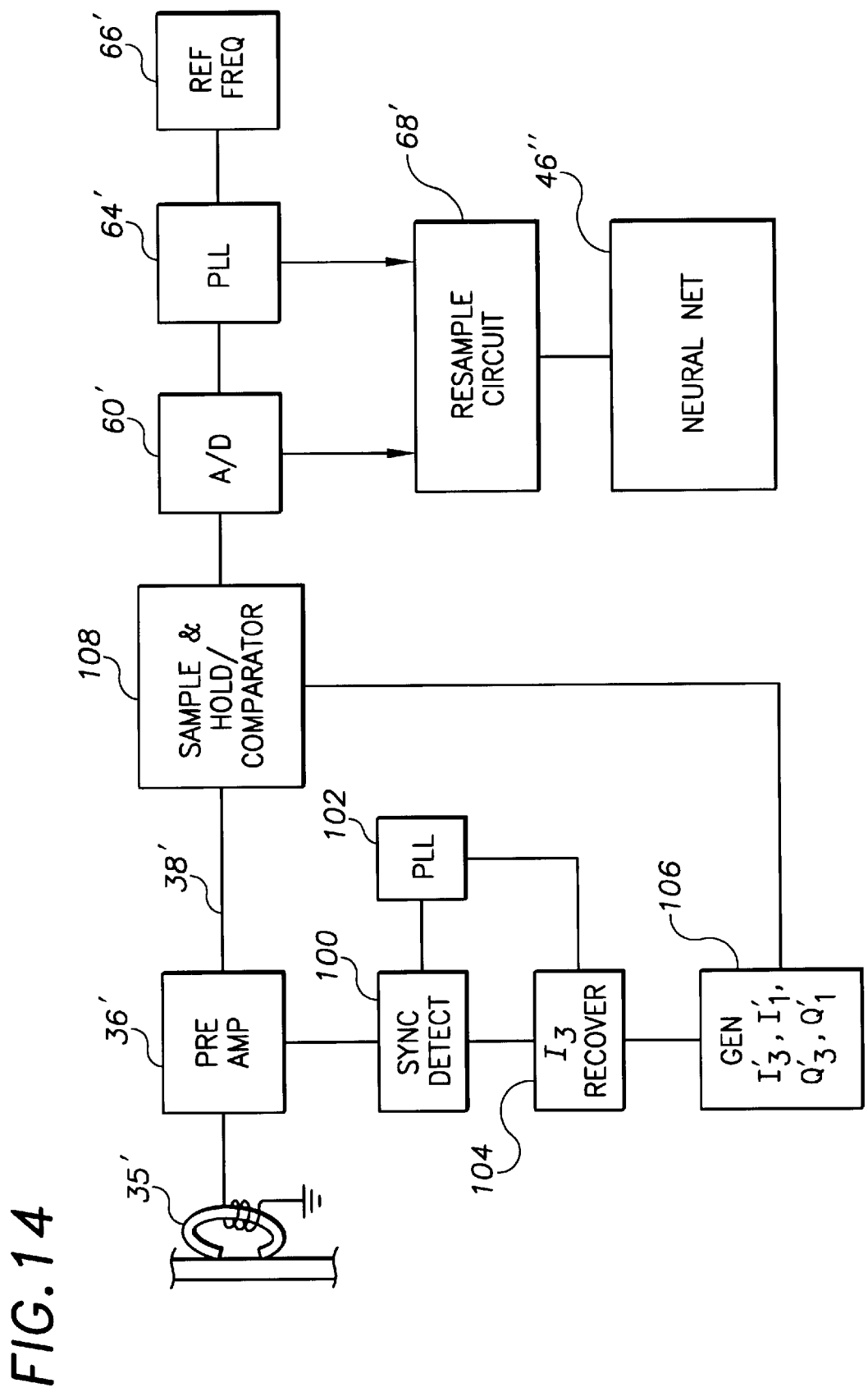
FIG. 14 is a block diagram of the circuits of the second embodiment of the invention.

Referring to FIG. 14, a playback head 35' feeds a preamp 36' having an output 38'. This output also is monitored by a synch detector 100 which gates out the playback $I_3$ signal from the recorded synch. A phase lock loop 102 is driven by this signal and runs at the rate of the $I_3$ which is recovered in circuit 104. The $I_3$ feeds generator 106 which is identical in construction and performance to the circuitry of FIG. 11, and generates the 4 signals, $I'_3$, $I'_1$, $Q'_3$, $Q'_1$. These signals have the phase relationships illustrated in FIG. 11, and are in the proper phase relationship to the recorded I,Q signals.

Figure 15:
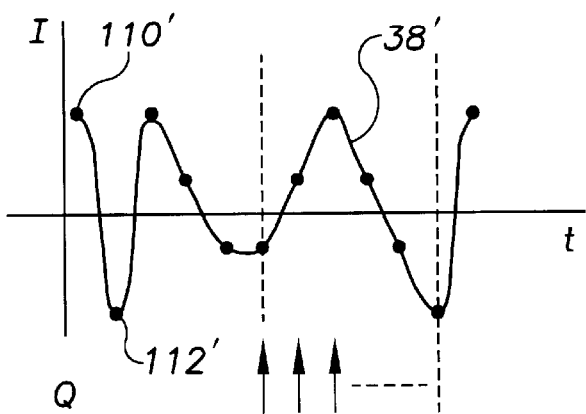
FIGS. 15–16 are curves related to playback of signals of the second embodiment of the invention.
Figure 16:
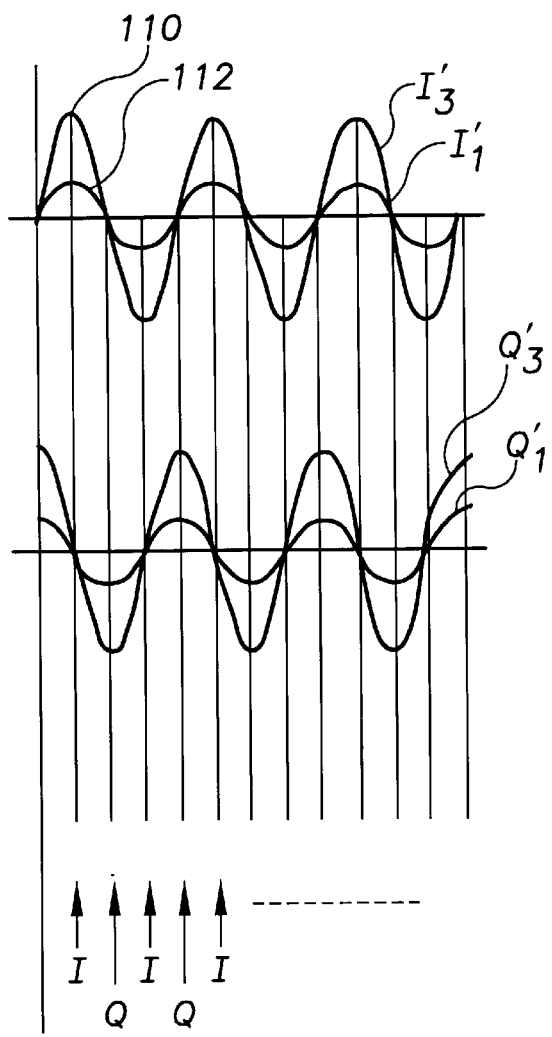

The playback waveform FIG. 15, is sampled by the sample and hold circuit 108 at the peaks of the recovered I' and Q' signals, shown in FIG. 16. At time 110, the I' signal is at a peak, and the playback signal is sampled (110'). The comparator 108 determines that the sample at 110' has the amplitude $I_3$ and is positive. Hence, the first readback I value is +3. The next sampling occurs at the peak of Q' 112, and the value of the playback signal 38' (112') has the amplitude $Q_3$, and is negative as determined in the sample and hold/comparator 108. Hence the first I,Q readouts are (3,-3), in agreement with the constellation of FIG. 10. This process continues at each I' and Q' peak, and by sampling and holding the playback signals 38' reproduces the 4 level waveform shown in FIG. 13a. The output of the sample and hold/comparator feeds the A/D converter 60' and the processing of the playedback information then follows the identical procedure through the corresponding remaining circuits 68', 46" as explained above in connection with FIG. 9.

Referring to the circuits of FIG. 9, it is to be noted that the described circuitry, except for the magnetic tape recorder/reproducer and the A/D converters, was "breadboarded" using the program entitled "Labview" developed by National Instrument Co., Austin, Tex. on a PC digital computer. This program accepts the digital inputs from the A/D converter 60 and then simulates the operation and interconnections between the PLL 64, resampling circuit 68 and neural network 46'. The program employs the error back-propagation algorithm to calculate the synaptic weights for the neurons of the neural network, and using these values provides the equalization and recovery for signals playedback from the magnetic tape transport. These weight values may also be used in a "hardwired" implementation of the equalization circuit of FIG. 9 using fixed electronic components, and where the weighing is performed by selected component adder networks at each neuron.

Figures 1, 17:
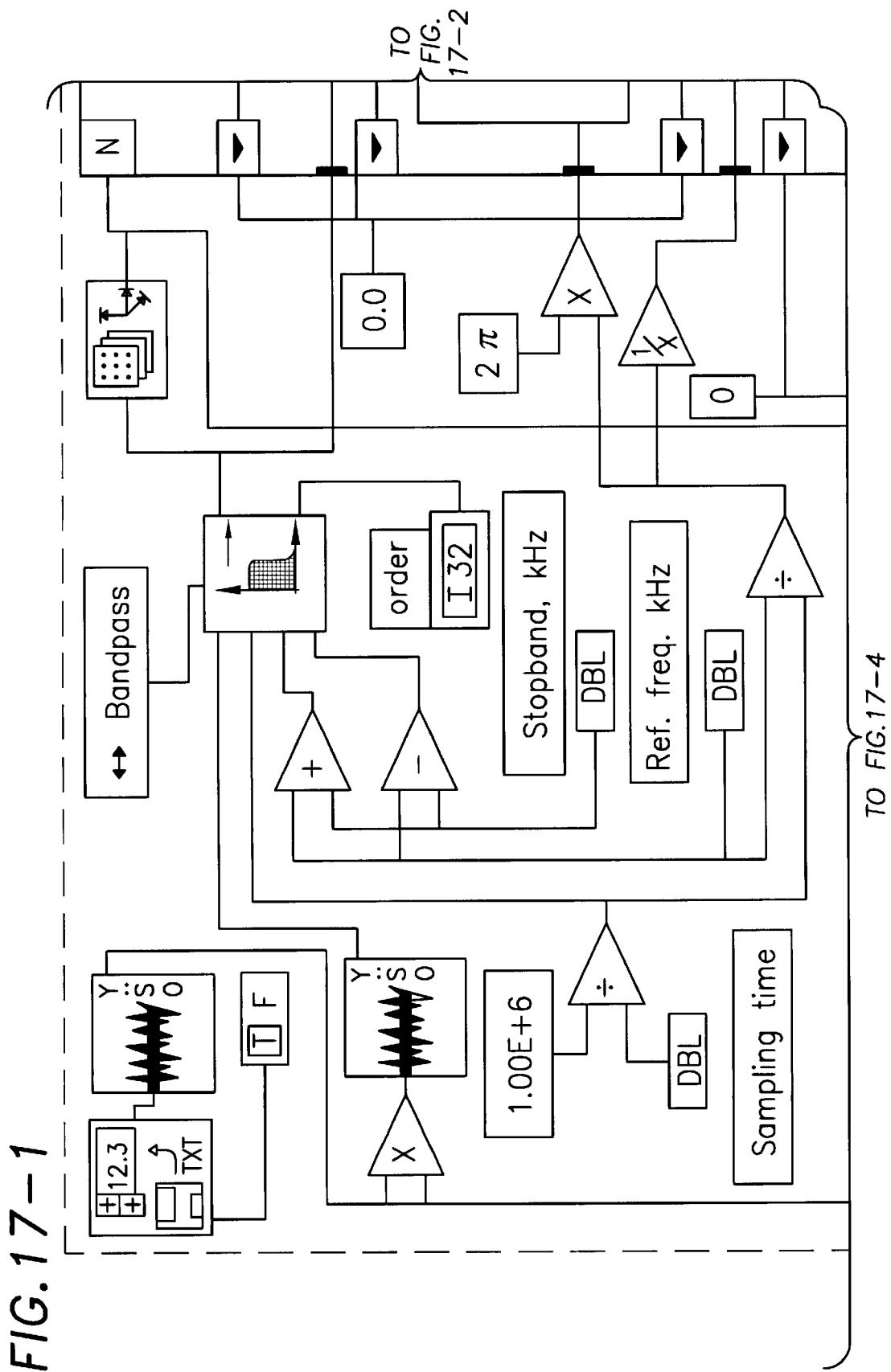
Figures 2, 17:
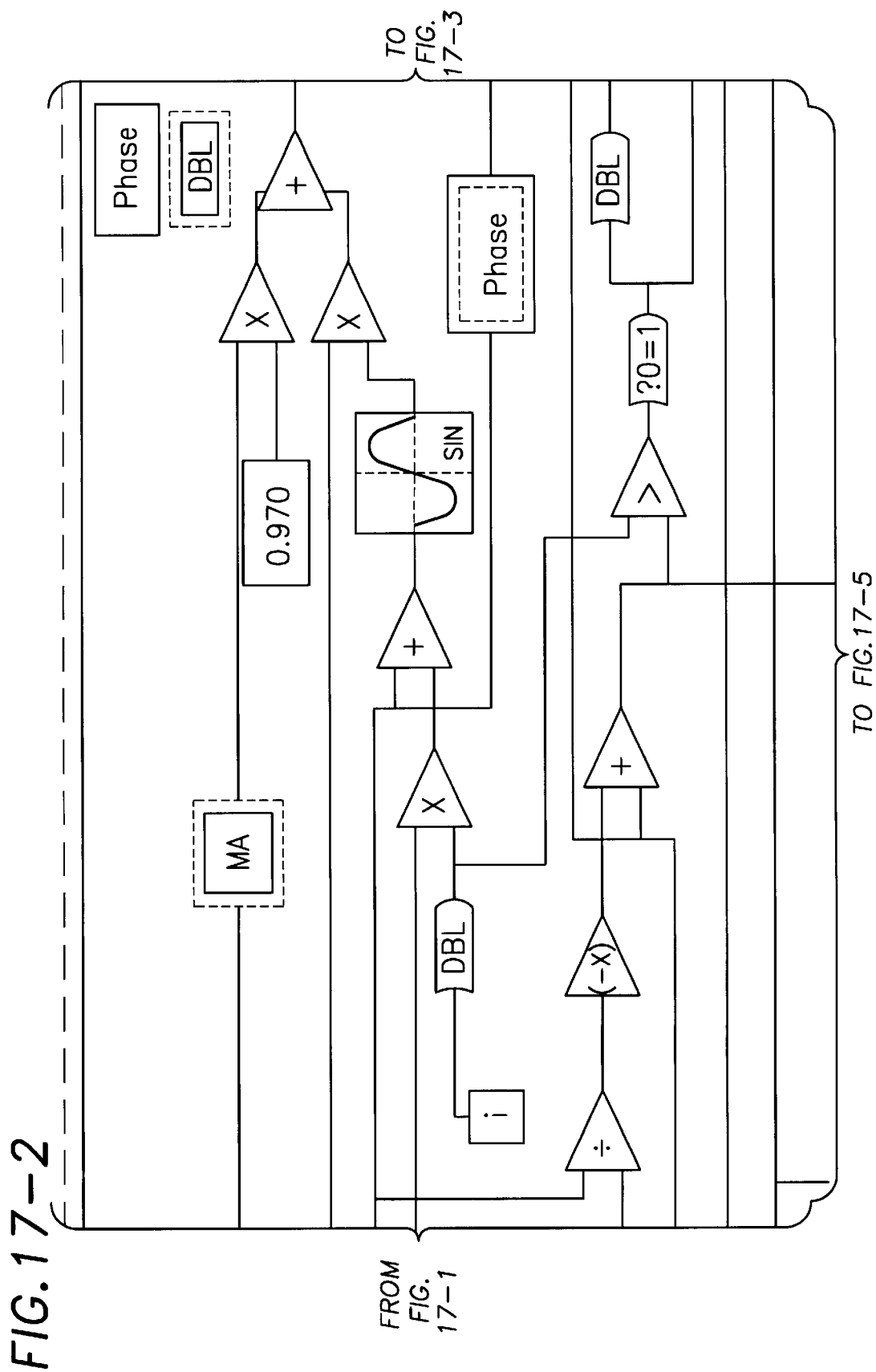
Figures 3, 17:
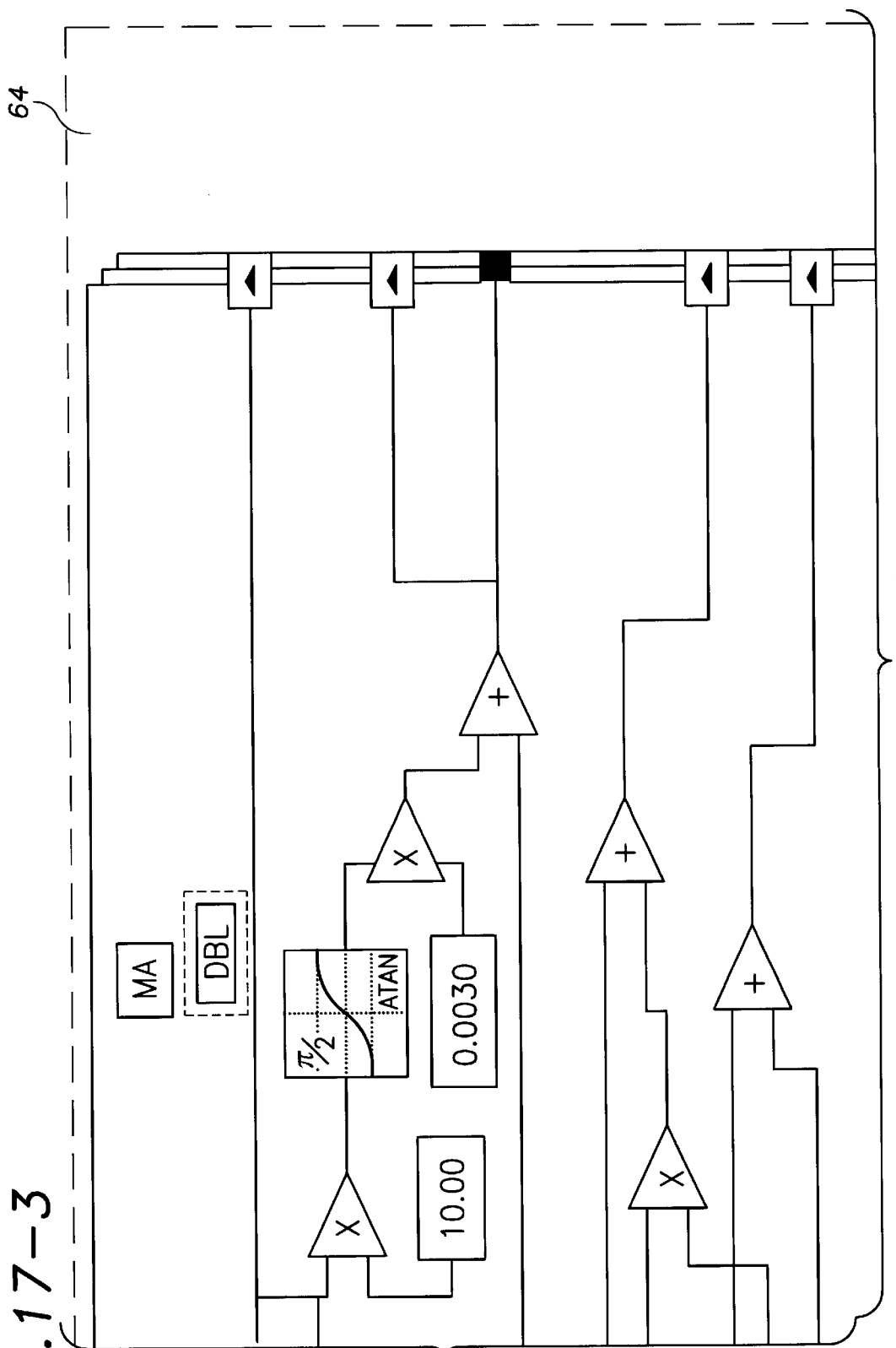
Figures 5, 17:
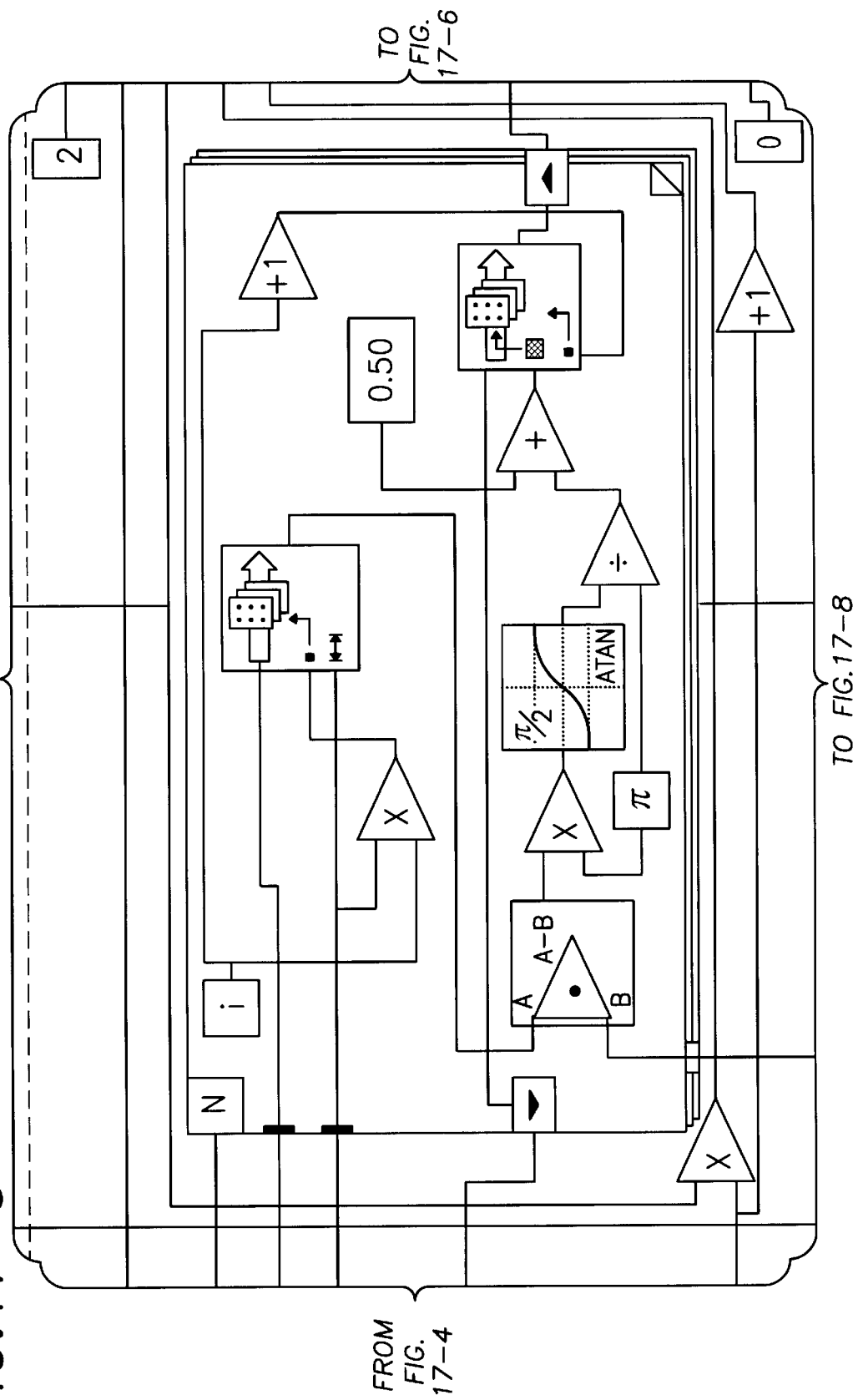
Figures 6, 17:
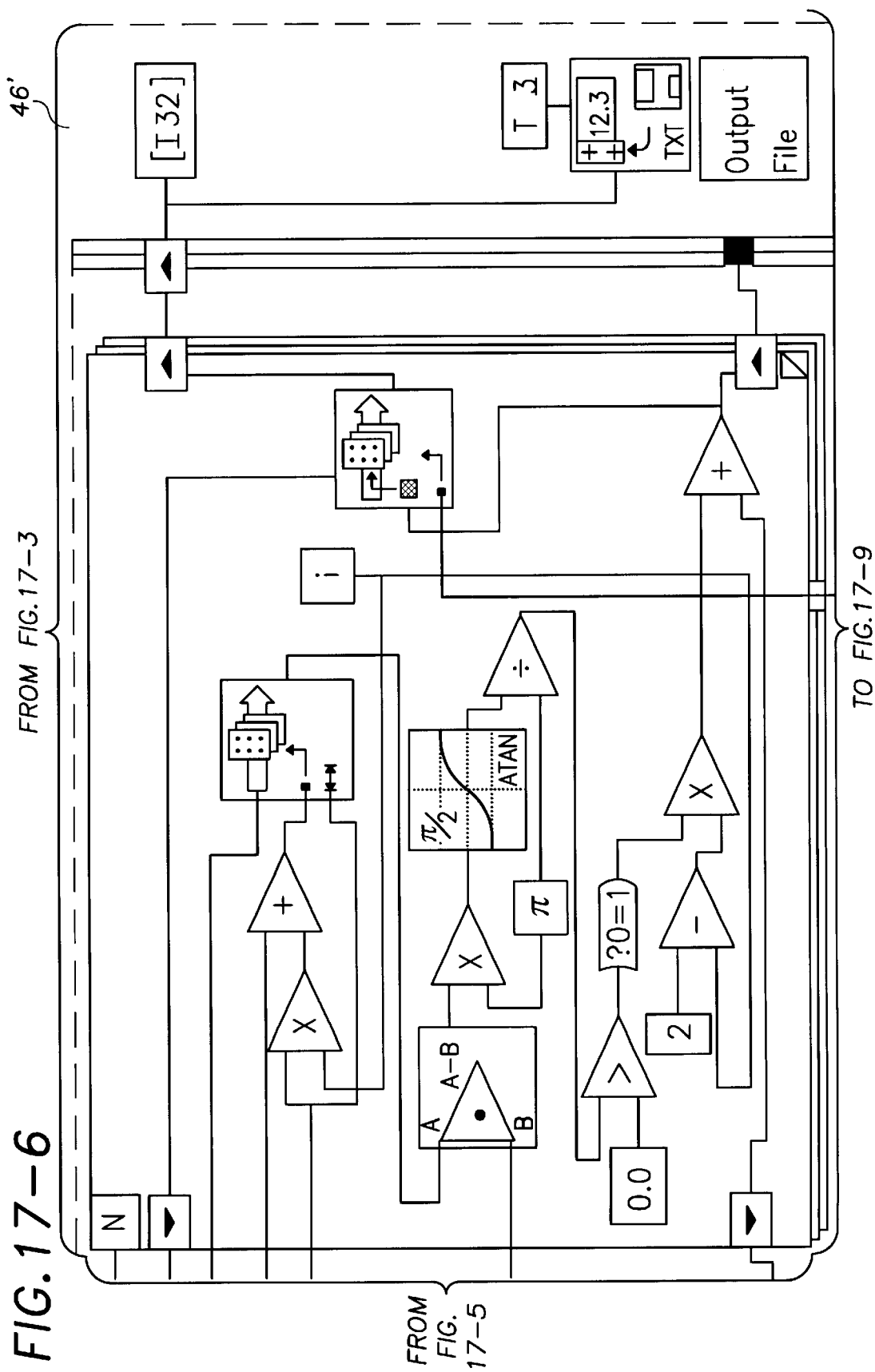
Figures 7, 17:
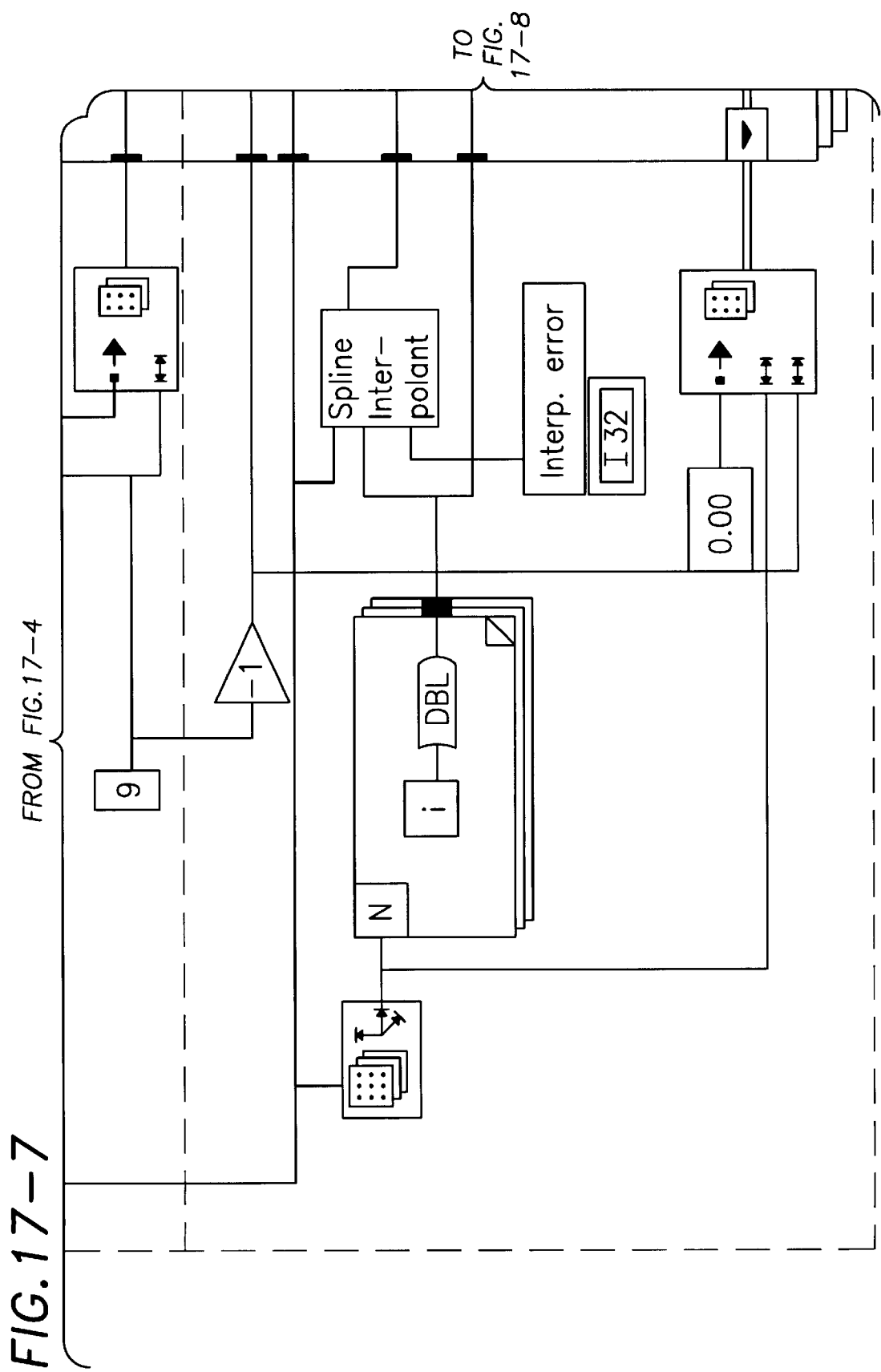
Figures 8, 17:
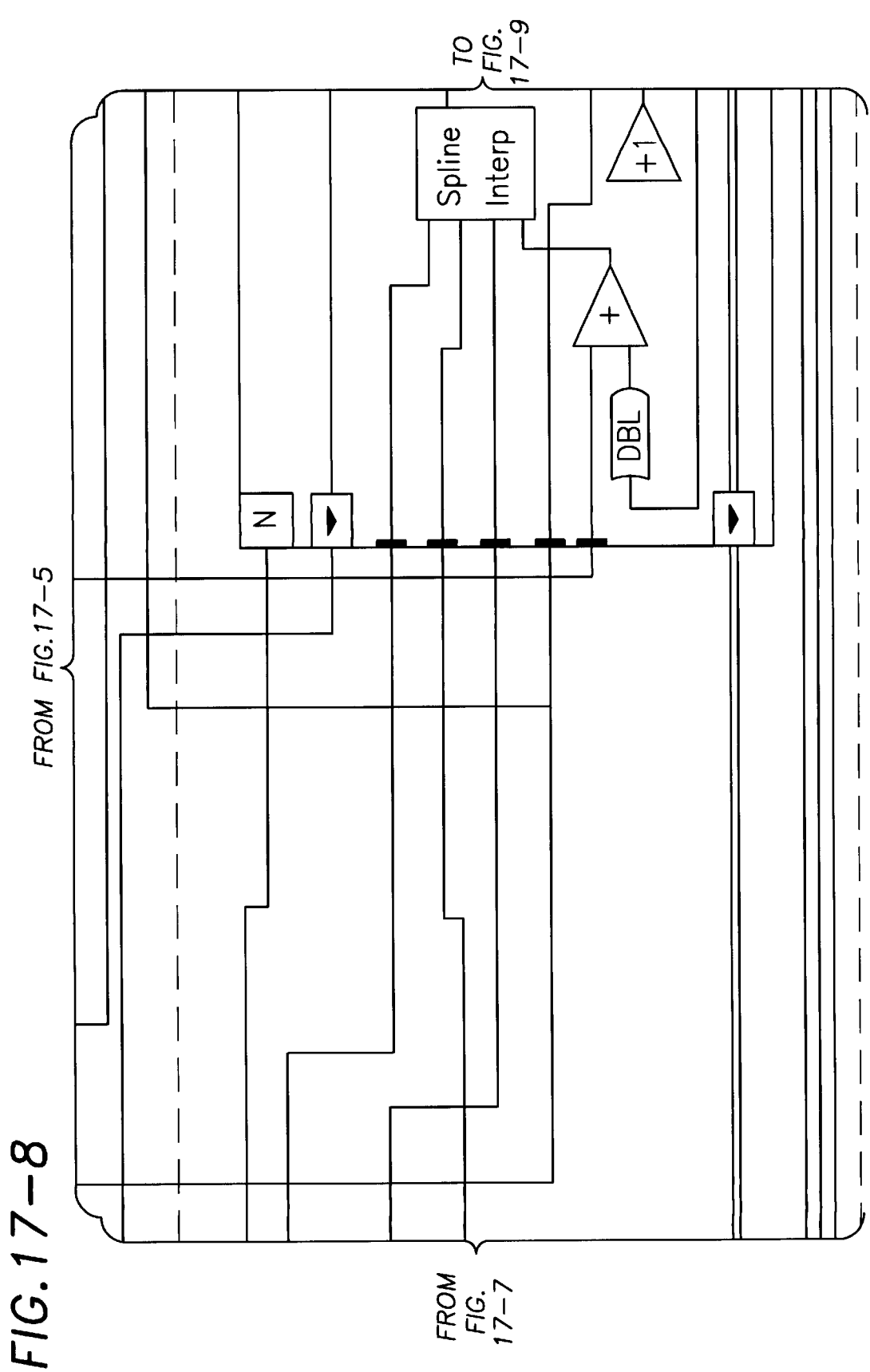
Figures 9, 17:
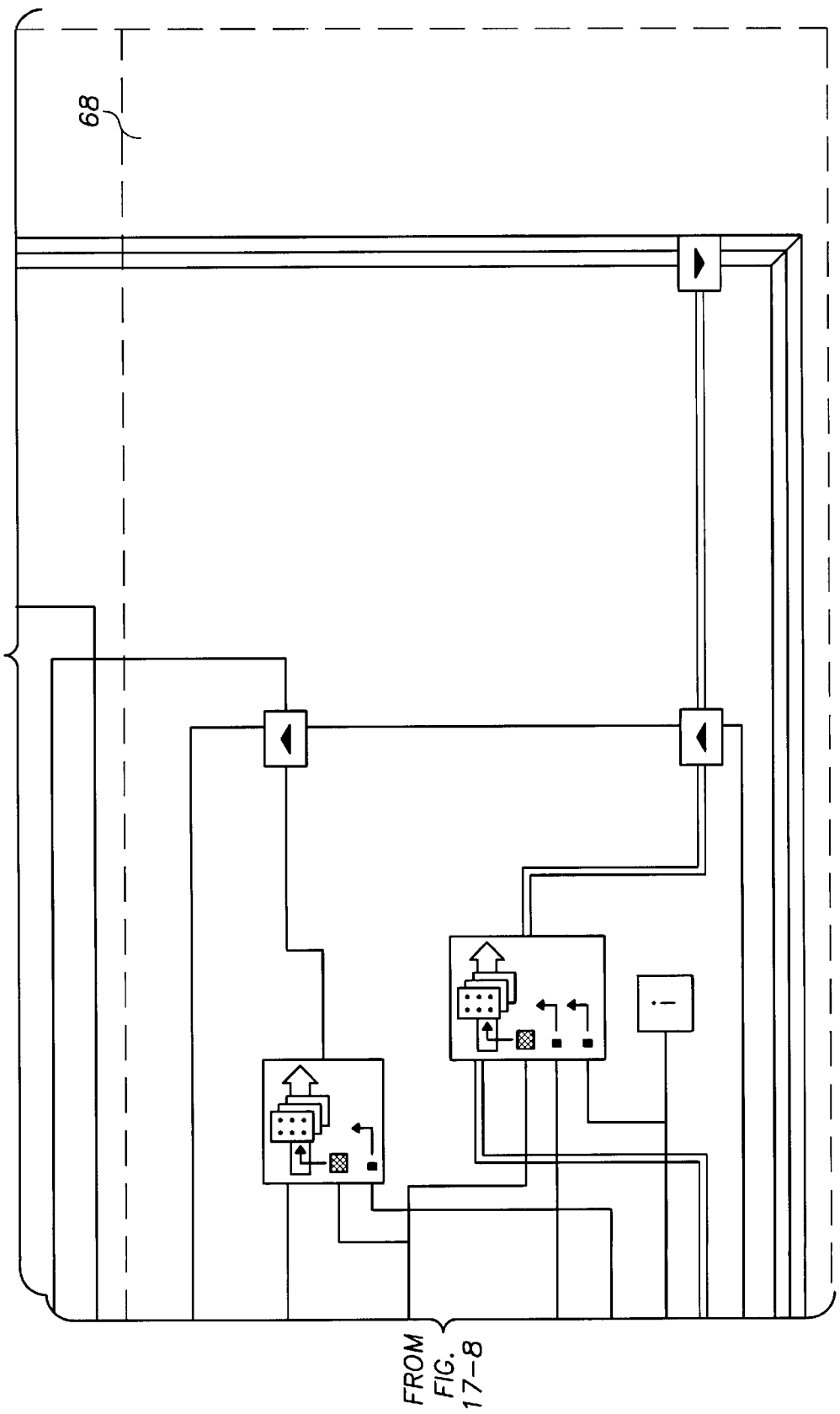

FIG. 17 is a "Labview" generated equivalent circuit diagram showing the interconnection of simulated elements making up the equalizer of the invention.

The invention has been described in detail with particular reference to preferred embodiments thereof, but it will be understood that variations and modifications can be effected within the spirit and scope of the invention. For example, depending upon the signal-to-noise ratio available in the system, more than 4 signal levels may be recorded with a corresponding increase in size of the neural network for playback equalization. An 8 level system would use a neural network providing 3 outputs generating 3 output bits rather than the 2 outputs described above for the 4 level system.

What is claimed is:

1. An information storage system including a magnetic recorder/reproducer having a magnetic tape information storage medium, said system for recording and playback of input information, said system comprising:

a) first convertor for processing said input information into multilevel signals, wherein said multilevel signals are greater than two levels, said magnetic recorder for storing said multilevel signals on said magnetic tare information storage medium, b) a bias generator for substantially eliminating hysteresis from said magnetic tape during recording, c) at least one of said levels having an amplitude great enough to cause nonlinear recording by said recorder on said magnetic tape, d) reproducer for recovering said multilevel signals by playback of said information storage medium to provide recovered multilevel signals, e) second convertor for transforming said recovered multilevel signals to recovered information signals, and f) a nonlinear map for processing said recovered information signals, wherein said nonlinear map equalizes said recovered information signals reproduced from said nonlinear recording, to replicate said input information.

2. The system of claim 1 wherein said multilevel signals comprise 4 signal levels.

3. The system of claim 1 wherein said nonlinear map is a neural network.

4. The system of claim 3 wherein said neural network comprises at least one layer of "hidden neurons", and one layer of "output neurons".

5. The system of claim 4 further comprising a training sequencer wherein performance determining weights are assigned to said neurons of said neural network through use of an error back-propagation algorithm.

6. The system of claim 5 wherein said neural network further comprises:

a) sampler unit for determining the amplitudes of said recovered information signals at fixed time delays, wherein vectors are derived from said recovered information signals having components equal to said amplitudes, b) storage unit wherein said components of said vectors are stored, c) transfer unit for transferring said components in parallel from said storage unit to inputs of said at least one layer of neurons comprising said neural network, wherein said components are processed by said neural network, d) output terminals of said neural network, wherein the output of said neural network is the equalized values of said recovered signals corresponding to said input information signals.

7. A system for storage and retrieval of 4 level quadrature amplitude modulated information signals, said system comprising:

a) a multilevel magnetic tape recorder/reproducer biased magnetic tape storage system having an input and an output, said output being a single valued nonlinear function of said input, wherein said 4 level quadrature amplitude modulated information signals are adapted as input to said multilevel magnetic tape recorder/reproducer biased magnetic tape storage system, further wherein at least one of said levels having an amplitude great enough to cause nonlinear recording by said recorder on said magnetic tape, and wherein said output of said multilevel storage system is substantially related to said input to provide multilevel output signals, b) a nonlinear map having as input said multilevel output signals from said multilevel magnetic tape recorder/reproducer biased magnetic tape storage system, wherein said nonlinear map is pretrained to have an output reproducing said 4 level quadrature amplitude modulated signals.

8. The multilevel storage unit of claim 7 wherein said nonlinear map is a neural network.

9. A method of storing and retrieving multilevel signals, wherein said multilevel signals are greater than two levels, comprising the steps of:

a) recording said multilevel signals on a hysteresis free, nonlinear storage medium, wherein at least one of said levels has an amplitude great enough to cause nonlinear recording on said medium, b) recovering multilevel playback signals from said storage medium, c) applying said multilevel playback signals as the input to a pretrained nonlinear map, d) retrieving said multilevel signals as the output of said nonlinear map.

* * * * *